(12) United States Patent
Takenaka

(10) Patent No.: US 11,340,842 B2
(45) Date of Patent: May 24, 2022

(54) SERVER SYSTEM

(71) Applicant: CANON KABUSHIKI KAISHA, Tokyo (JP)

(72) Inventor: Shuichi Takenaka, Chiba (JP)

(73) Assignee: Canon Kabushiki Kaisha, Tokyo (JP)

(*) Notice: Subject to any disclaimer, the term of this patent is extended or adjusted under 35 U.S.C. 154(b) by 21 days.

(21) Appl. No.: 17/096,733

(22) Filed: Nov. 12, 2020

(65) Prior Publication Data

US 2021/0157532 A1     May 27, 2021

(30) Foreign Application Priority Data

Nov. 25, 2019 (JP) .............................. JP2019-212297

(51) Int. Cl.
*G06F 3/12* (2006.01)

(52) U.S. Cl.
CPC .......... *G06F 3/1205* (2013.01); *G06F 3/1204* (2013.01); *G06F 3/1255* (2013.01); *G06F 3/1259* (2013.01); *G06F 3/1288* (2013.01)

(58) Field of Classification Search
CPC .... G06F 3/1205; G06F 3/1204; G06F 3/1255; G06F 3/1259; G06F 3/1288; G06F 3/126
USPC ......................................................... 358/1.15
See application file for complete search history.

(56) References Cited

U.S. PATENT DOCUMENTS

| | | | |
|---|---|---|---|
| 10,079,954 B2* | 9/2018 | Morita | H04N 1/00347 |
| 10,558,411 B2* | 2/2020 | Sakurai | G06F 3/1212 |
| 2018/0113655 A1* | 4/2018 | Sawata | G06F 3/1208 |

FOREIGN PATENT DOCUMENTS

JP          2013-012049 A     1/2013

* cited by examiner

*Primary Examiner* — Neil R McLean
(74) *Attorney, Agent, or Firm* — Canon U.S.A., Inc., IP Division

(57) ABSTRACT

A server system includes a determination unit configured to determine whether received print data is print data for which a predetermined print setting is made, an acquisition unit configured to acquire first print data from another server system, the first print data being determined to be print data for which the predetermined print setting is made by the determination unit, a first transmission unit configured to transmit the first print data acquired by the acquisition unit to an image forming apparatus, and a control unit configured to control the image forming apparatus to acquire second print data from the other server system without acquiring the second print data determined to be print data for which the predetermined print setting is not made by the determination unit.

13 Claims, 19 Drawing Sheets

FIG.6A

```
┌─────────────────────────────────────────────────┐
│                     PRINT                       │
├─────────────────────────────────────────────────┤
│                                                 │
│  PRINTER  [_____]~601     │
│                                                 │
│  ┌···············································┐│
│  : NUMBER  [    ]   ☐ MONOCHROME  ☐ DOUBLE-SIDED :│
│  : OF COPIES                                    :│
│  :                                              :│
│  : PAGES  ○ ALL                                 :│
│  :                                              :│
│  :        START [    ]  END [    ]         ~602 :│
│  :                                              :│
│  : SHEET SIZE  [ A4      ▽]                     :│
│  └···············································┘│
│                                                 │
│  [ADVANCED SETTINGS]     [CANCEL]    [ PRINT ]  │
└─────────────────────────────────────────────────┘
        605               604          603
```

FIG.6B

```
┌─────────────────────────────────────────────────┐
│               ADVANCED SETTINGS                 │
├─────────────────────────────────────────────────┤
│ ┌···············································┐│
│ : STAPLE              [ OFF         ▽]         :│
│ :                                              :│
│ : PUNCH               [ OFF         ▽]         :│
│ :                                         ~606 :│
│ : HALFTONE            [ RESOLUTION  ▽]         :│
│ :                                              :│
│ : CMYK INPUT PROFILE  [ Japan Color ▽]         :│
│ :                                              :│
│ : RGB INPUT PROFILE   [ sRGB        ▽]         :│
│ :                                              :│
│ : RENDERING INTENT    [ Perceptual  ▽]         :│
│ └···············································┘│
│                                                 │
│                         [CANCEL]    [   OK   ]  │
└─────────────────────────────────────────────────┘
                          608          607
```

FIG.7A

| PRINT JOB ID | DOCUMENT DATA | PRINT DATA | BASIC SETTINGS INFORMATION |
|---|---|---|---|
| 000001 | Patent.doc | Patent.prn | 2Up/CL/Duplex |

FIG.7B

| PRINT JOB ID | DOCUMENT DATA | PRINT DATA | BASIC SETTINGS INFORMATION | ADVANCED SETTINGS INFORMATION |
|---|---|---|---|---|
| 000001 | Patent.doc | Patent.prn | 2Up/CL/Duplex | RESOLUTION/Japan Color/sRGB/Perceptual/Staple |
| 000002 | Specification.ppt | Specification.prn | 4Up/BW/Simplex | None/ |
| 000003 | Requirement.ppt | Requirement.prn | 1Up/CL/Duplex | RESOLUTION/Euro Standard/sRGB/Perceptual/Punch |

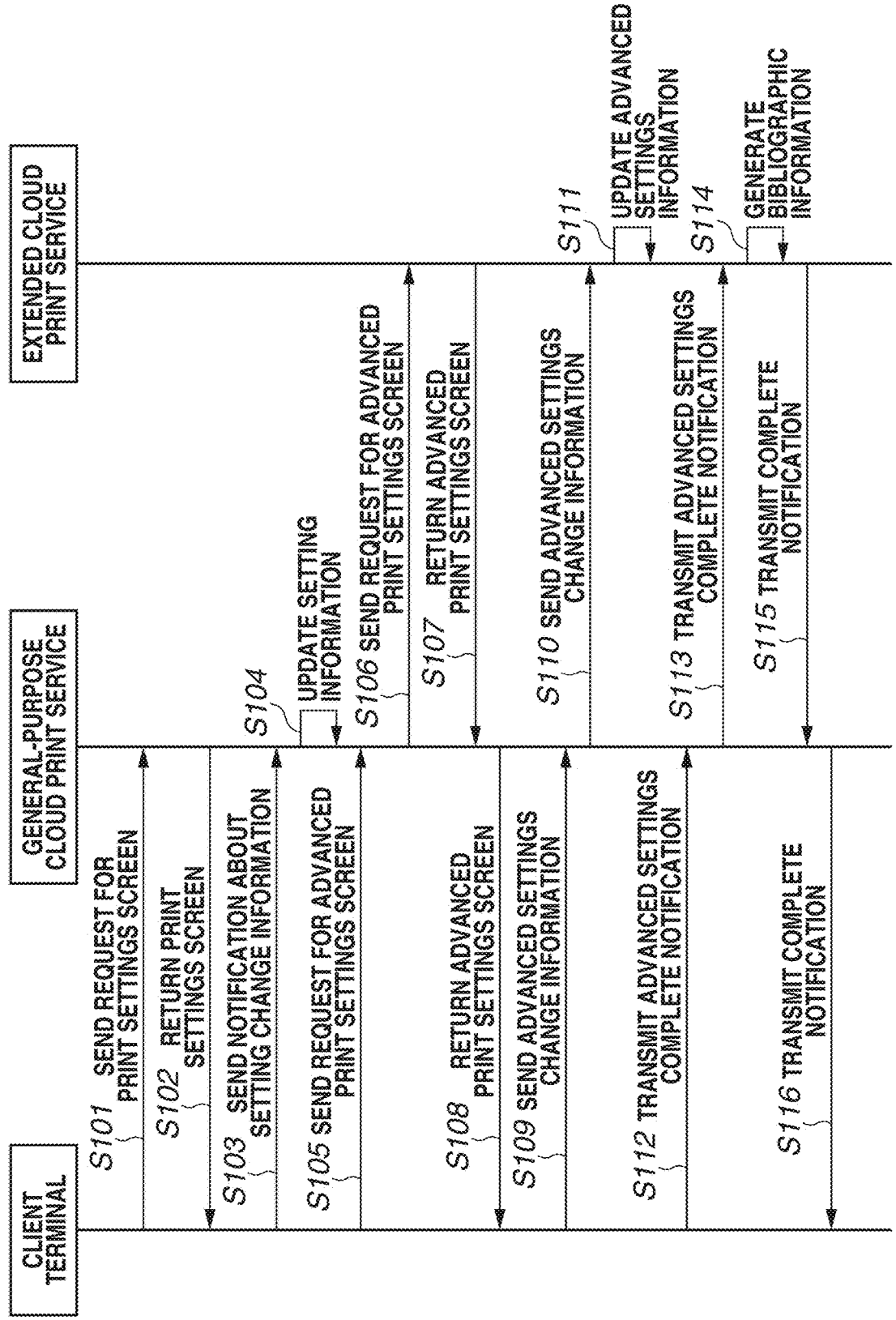

SERVER SYSTEM

BACKGROUND

Field of the Disclosure

The present disclosure relates to a server system.

Description of the Related Art

With the popularization of cloud services, a method is known in which document data and image data to be used for printing are uploaded to a cloud service and the document data and image data are transmitted from the cloud service to an image forming apparatus. According to this method, transmission of print data via a cloud service enables every image forming apparatus connected to the cloud service via a network to execute printing based on the print data (Japanese Patent Application Laid-Open No. 2013-12049).

Cloud services provide such services that a print setting screen on which general-purpose setting items can be set is displayed, print data in which settings made through the displayed print setting screen are reflected is generated, and the generated print data is transmitted to an image forming apparatus. On such a print setting screen provided by cloud services, only the general-purpose setting items, such as a color mode setting and a double-sided printing setting, which can be made in any image forming apparatus, can be set. Accordingly, in printing using cloud services, printing using setting items, such as stapling, punching, folding, and selection of image processing profiles, which can be set in printing using printer drivers of related art, cannot be executed. Therefore, the following technique is now being under review. That is, a server system capable of generating print data for which print settings that cannot be made in cloud services are made is used in collaboration with cloud services so that printing compatible with print settings that cannot be made in cloud services can be executed.

In the case of performing printing using the server system in collaboration with cloud services as described above, it is assumed that printing is executed in the following procedure. That is, registered data and print settings are transmitted to a server system via a cloud service, and the server system generates print data based on the received data and print settings and settings made on the server system, and transmits the generated print data to an image forming apparatus. In printing using a cloud service, only print settings that can be made on a print setting screen provided by the cloud service may be made. In such a case, if the server system acquires data and print settings and generates print data, a communication load is increased by the amount corresponding to the amount of data to be transferred between the cloud service and the server system.

SUMMARY

According to embodiments of the present disclosure, a server system includes a determination unit configured to determine whether received print data is print data for which a predetermined print setting is made, an acquisition unit configured to acquire first print data from a first service, the first print data being determined to be print data for which the predetermined print setting is made by the determination unit, a first transmission unit configured to transmit the first print data acquired by the acquisition unit to an image forming apparatus, and a unit configured to instruct the first service to transmit second print data to the image forming apparatus without acquiring the second print data determined to be print data for which the predetermined print setting is not made by the determination unit.

Further features of the present disclosure will become apparent from the following description of exemplary embodiments with reference to the attached drawings.

BRIEF DESCRIPTION OF THE DRAWINGS

FIGS. 6A and 6B illustrate examples of print setting screens according to the first exemplary embodiment.

FIGS. 7A and 7B are tables each illustrating a data configuration of bibliographic information according to the first exemplary embodiment.

FIG. 8 is a sequence diagram illustrating an example of a processing sequence during print setting according to the first exemplary embodiment.

DESCRIPTION OF THE EMBODIMENTS

Embodiments of the present disclosure will be described below with reference to the drawings.

(System Configuration Diagram)

Figure 1:
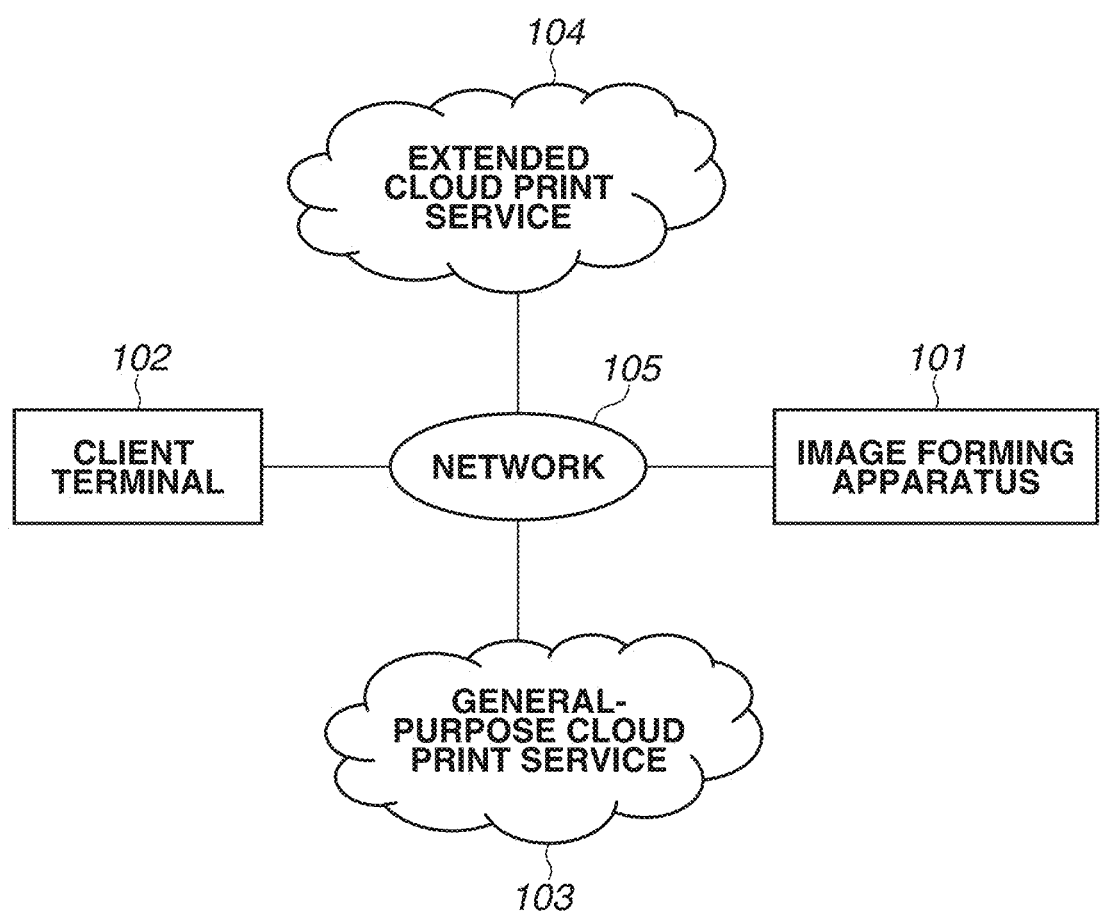
FIG. 1 illustrates a configuration example of a system according to a first exemplary embodiment.

A configuration example of a system according to a first exemplary embodiment of the present disclosure will be described with reference to FIG. 1. The system according to the first exemplary embodiment includes an image forming apparatus 101, a client terminal 102, a general-purpose cloud print service 103, and an extended cloud print service 104. The image forming apparatus 101, the client terminal 102, the general-purpose cloud print service 103, and the extended cloud print service 104 are connected to each other via a network 105.

Examples of the image forming apparatus 101 include a multi-function peripheral having various functions, such as scanning, facsimile (FAX), and copying, and a printer having only a print function. The image forming apparatus 101 forms an image using a recording material such as toner or ink.

The client terminal 102 is an information processing apparatus such as a personal computer (PC), a cellular phone, a personal digital assistant (PDA), a smartphone, or a tablet, which is operated by a user.

The general-purpose cloud print service 103 is a cloud service that enables, for example, creating document data, sharing data among a plurality of users, and co-editing. The general-purpose cloud print service 103 provides a print function for printing document data and image data created via a cloud service, and data uploaded to a cloud print service. The print function provided by the general-purpose cloud print service 103 is capable of making only a limited number of print settings, such as N-in-one printing, designation of a page range for printing, a layout for double-sided printing, and designation of the number of copies. The general-purpose cloud print service 103 generates print data based on print settings made by the user, and transmits the generated print data to the image forming apparatus 101.

The extended cloud print service 104 is a print service capable of making advanced settings that cannot be made in the general-purpose cloud print service 103. Examples of the print settings that cannot be made in the general-purpose cloud print service 103 include a finishing setting depending on a finisher, a profile setting in which built-in color profiles are applied, a font substitution setting depending on loaded fonts, and a poster print setting. In addition, image processing methods and the like used for halftone representation cannot be set in the general-purpose cloud print service 103, but can be set in the extended cloud print service 104. The extended cloud print service 104 generates print data depending on print settings made by the user, and transmits the generated print data to the image forming apparatus 101.

In the first exemplary embodiment, the client terminal 102 accesses the general-purpose cloud print service 103 and uses various cloud services. The general-purpose cloud print service 103 can designate only basic functions. Accordingly, it may be desirable to make advanced print settings via the extended cloud print service 104. Before a print job is started in the general-purpose cloud print service 103, the client terminal 102 connects to the extended cloud print service 104 to make advanced settings. After that, the client terminal 102 issues a print start instruction, and then print data is transferred from the general-purpose cloud print service 103 to the extended cloud print service 104. The extended cloud print service 104 generates print data in which advanced settings are reflected in the received print data, and transmits the generated print data to the image forming apparatus 101.

(Hardware Block Diagram of Image Forming Apparatus)

Figure 2:
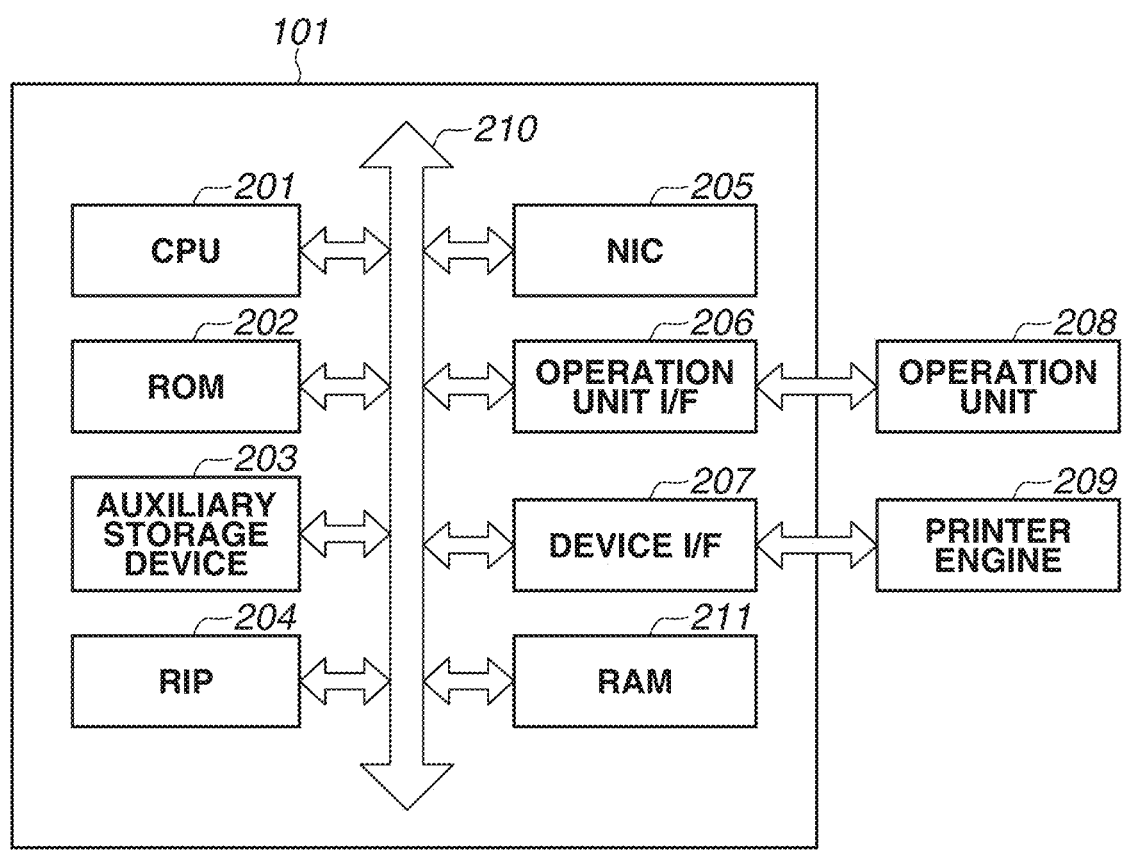
FIG. 2 is a block diagram illustrating a hardware configuration example of an image forming apparatus according to first exemplary embodiment.

FIG. 2 is a block diagram illustrating a hardware configuration example of the image forming apparatus 101 according to the first exemplary embodiment. Hardware blocks illustrated in FIG. 2 are merely examples of the hardware blocks constituting the image forming apparatus 101. The image forming apparatus 101 may include hardware blocks other than the hardware blocks illustrated in FIG. 2.

A central processing unit (CPU) 201 reads out programs stored in an auxiliary storage device 203 into a read-only memory (ROM) 202, and executes the programs. Further, the CPU 201 controls devices connected to a system bus 210 in an integrated manner.

The ROM 202 is a memory that stores programs and the like for operating the image forming apparatus 101. A random access memory (RAM) 211 is a memory in which programs to be executed by the CPU 201 are loaded.

The auxiliary storage device 203 is also used to hold a large capacity of data temporarily or for a long period of time. A hard disk drive (HDD), a solid state drive (SDD), or the like is used as the auxiliary storage device 203.

A raster image processor (RIP) 204 is a dedicated hardware module for converting intermediate print data into a raster image. The RIP 204 rapidly processes the intermediate print data generated on the ROM 202 by the CPU 201 in parallel with the execution of the CPU 201.

A network interface controller (NIC) 205 is an interface that connects to the network 105 and inputs and outputs print data and device information from and to the outside of a printer.

An operation unit interface (I/F) 206 is an interface unit with an operation unit 208, and outputs image data to be displayed on the operation unit 208 to the operation unit 208. Further, the operation unit I/F 206 transmits information input by the user of the apparatus from the operation unit 208 to the CPU 201.

A device I/F 207 delivers image signals, issues a device operation instruction, and receives device information based on instructions from the CPU 201.

The operation unit 208 includes a liquid crystal panel and a sound source as output devices, and a touch panel, hardware keys, and a microphone as input devices.

A printer engine 209 is an output device that outputs image signals onto a medium. The printer engine 209 can use any printing method such as an electrophotographic method or an inkjet method.

(Hardware Block Diagram of Client Terminal)

Figure 13:
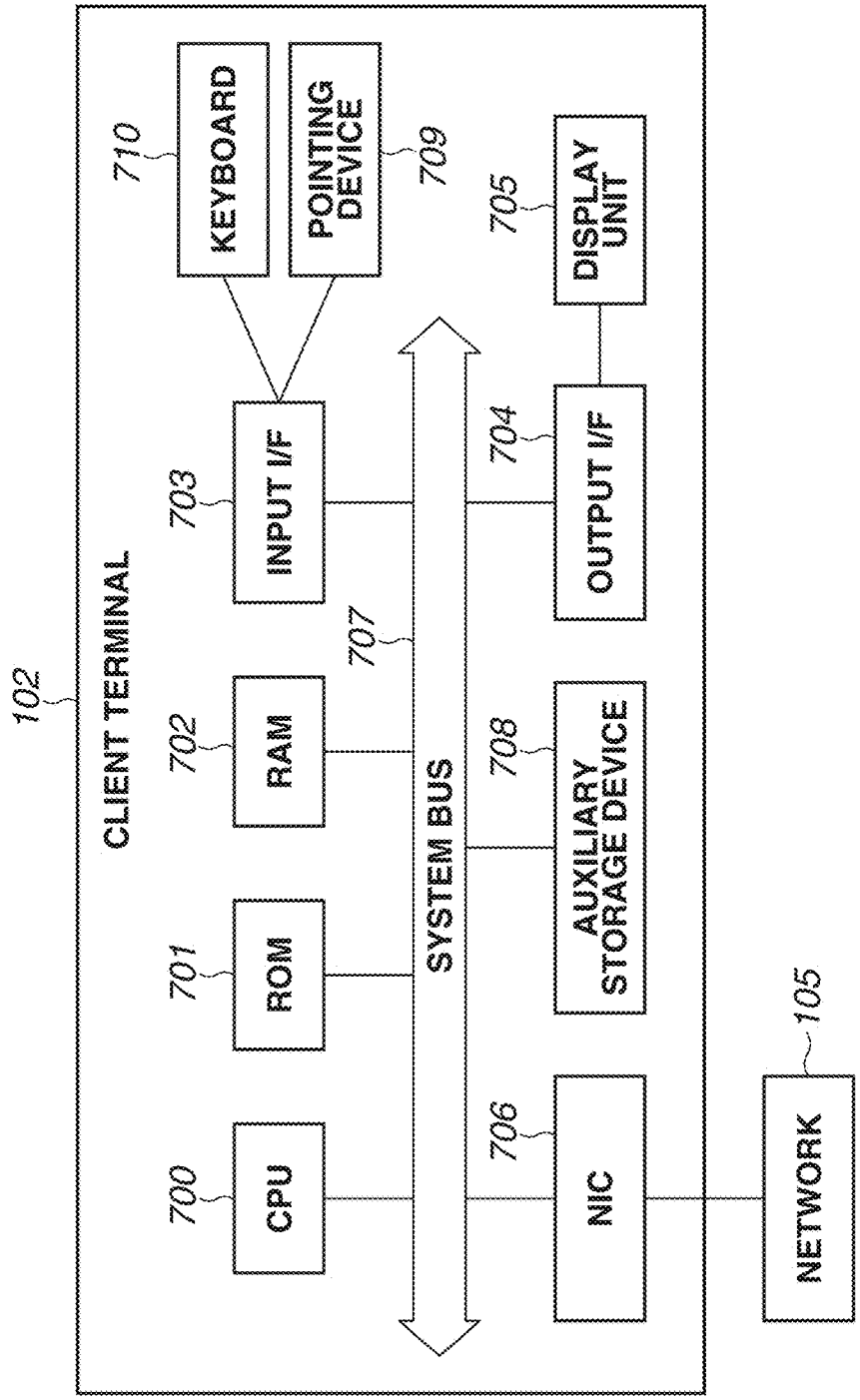
FIG. 13 is a block diagram illustrating a hardware configuration example of a client terminal according to the first exemplary embodiment.

FIG. 13 is a block diagram illustrating a hardware configuration example of the client terminal 102.

A CPU 700 controls an overall operation of the client terminal 102 based on programs stored in a ROM 701 or an auxiliary storage device 708. A RAM 702 is also used as a work area for the CPU 700 to perform various processing operations. The auxiliary storage device 708 stores applications, operating systems (OSs), and the like.

An input I/F 703 is an interface for receiving an input from an external device. A keyboard 710 and a pointing device 709 as typified by a mouse and a touch panel are connected to the input I/F 703. The input devices, such as the keyboard 710, the mouse, and the touch panel, are devices used for the user to issue various instructions to a computer through the input I/F 703. An output I/F 704 is an interface for outputting data to the outside of the apparatus. The output I/F 704 outputs data to the output devices such as a display unit 705. A system bus 707 is a common data system bus. The system bus 707 is used to exchange data among the hardware modules constituting the client terminal 102. An NIC 706 is an interface for connecting the client terminal 102 to the network 105.

(Software Module Diagram of Image Forming Apparatus)

Figure 3:
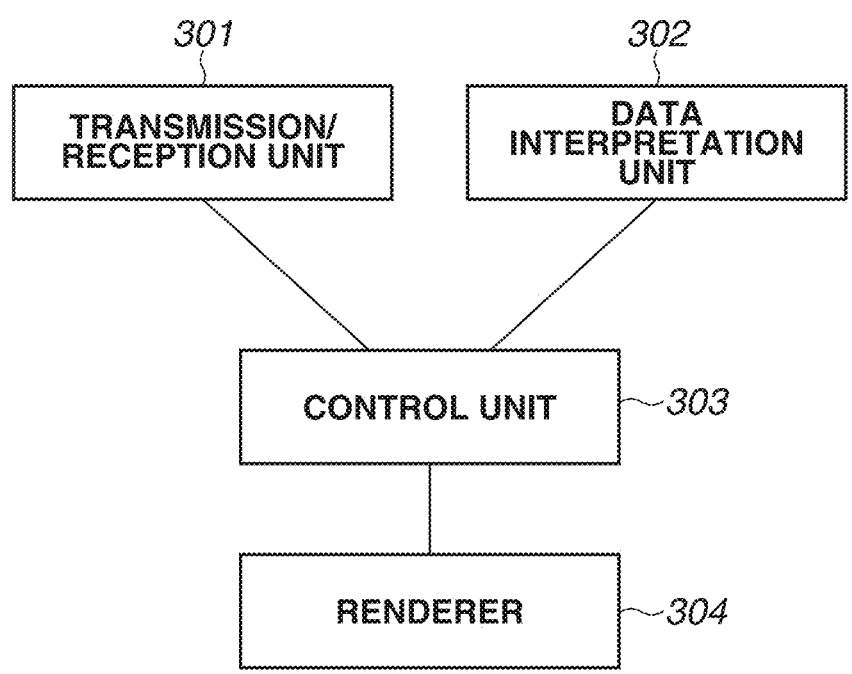
FIG. 3 is a block diagram illustrating examples of software modules of the image forming apparatus according to the first exemplary embodiment.

FIG. 3 is a block diagram illustrating examples of software modules of the image forming apparatus 101 according to the first exemplary embodiment. The software modules illustrated in FIG. 3 are stored as programs in the ROM 202 or the auxiliary storage device 203, and are loaded into the RAM 211 and executed by the CPU 201.

A transmission/reception unit 301 receives print data from the client terminal 102, the extended cloud print service 104, and the general-purpose cloud print service 103 via a network.

A data interpretation unit 302 loads print data received by the transmission/reception unit 301 via a control unit 303, and interprets drawing information in the print data. The drawing information extracted as a result of data interpretation processing is sent to a renderer 304 via the control unit 303, and rendering processing is executed.

The control unit 303 manages various control processing operations, including transmission and reception of print data, data interpretation, image rendering, management of terminal information and print setting information to be described below, and control of a remote setting screen according to the first exemplary embodiment.

The renderer 304 generates a bitmap image using the RIP 204 based on the drawing information sent from the data interpretation unit 302. The generated bitmap image is sent to the printer engine 209 via the device I/F 207, and image forming processing is executed on a printing sheet.

(Software Module Diagram of General-Purpose Cloud Print Service)

Figure 4:
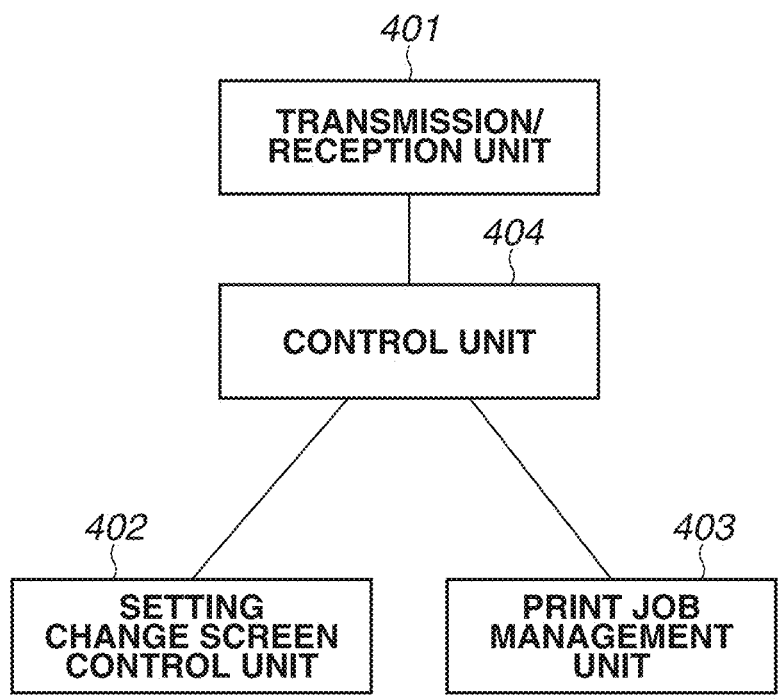
FIG. 4 is a block diagram illustrating examples of software modules of a general-purpose cloud print service according to the first exemplary embodiment.

FIG. 4 is a block diagram illustrating examples of software modules of the general-purpose cloud print service 103 according to the first exemplary embodiment. The general-purpose cloud print service 103 includes one or more information processing apparatuses each including hardware modules similar to those of the client terminal 102 illustrated in FIG. 3. The software modules illustrated in FIG. 4 are implemented such that programs stored in the ROM 701 or the auxiliary storage device 708 are loaded into the RAM 702 and the loaded programs are executed by the CPU 700.

A transmission/reception unit 401 executes transmission and reception of print data to and from the client terminal 102 via a network. Further, the transmission/reception unit 401 receives a print setting, a print instruction, and the like from the client terminal 102, and transmits generated print data to the extended cloud print service 104 and the image forming apparatus 101.

A setting change screen control unit 402 controls display of a screen for making print settings when printing based on document data and image data is performed by the general-purpose cloud print service 103. The number of print settings that can be made on the print setting screen in the general-purpose cloud print service 103 is less than the number of print settings that can be made in the extended cloud print service 104. Examples of the print settings that can be made in the extended cloud print service 104 include N-in-one printing, designation of a page range for printing, a layout for double-sided printing, and designation of the number of copies.

A print job management unit 403 manages a print job for printing based on document data and image data. Image forming apparatuses to which the print job can be input from the general-purpose cloud print service 103 are managed in a print queue. The print job management unit 403 generates a print job in response to a print job execution request from the user, allocates the print job to the print queue, and manages the print queue. Print setting information set on the print setting screen of the setting change screen control unit 402 is also held and managed in the same print queue. Examples of the print queue that can be registered by the print job management unit 403 include a print queue corresponding to each image forming apparatus registered in an extended cloud printer. The user can select, as a print data transmission destination, each image forming apparatus registered in the extended cloud print service 104 on the client terminal 102.

A control unit 404 manages various control processing operations, including transmission or reception of print data, control of a print setting screen, management of print setting information, generation of a print job, and control of a print queue, according to the first exemplary embodiment.

(Software Module Diagram of Extended Cloud Print Service)

Figure 5:
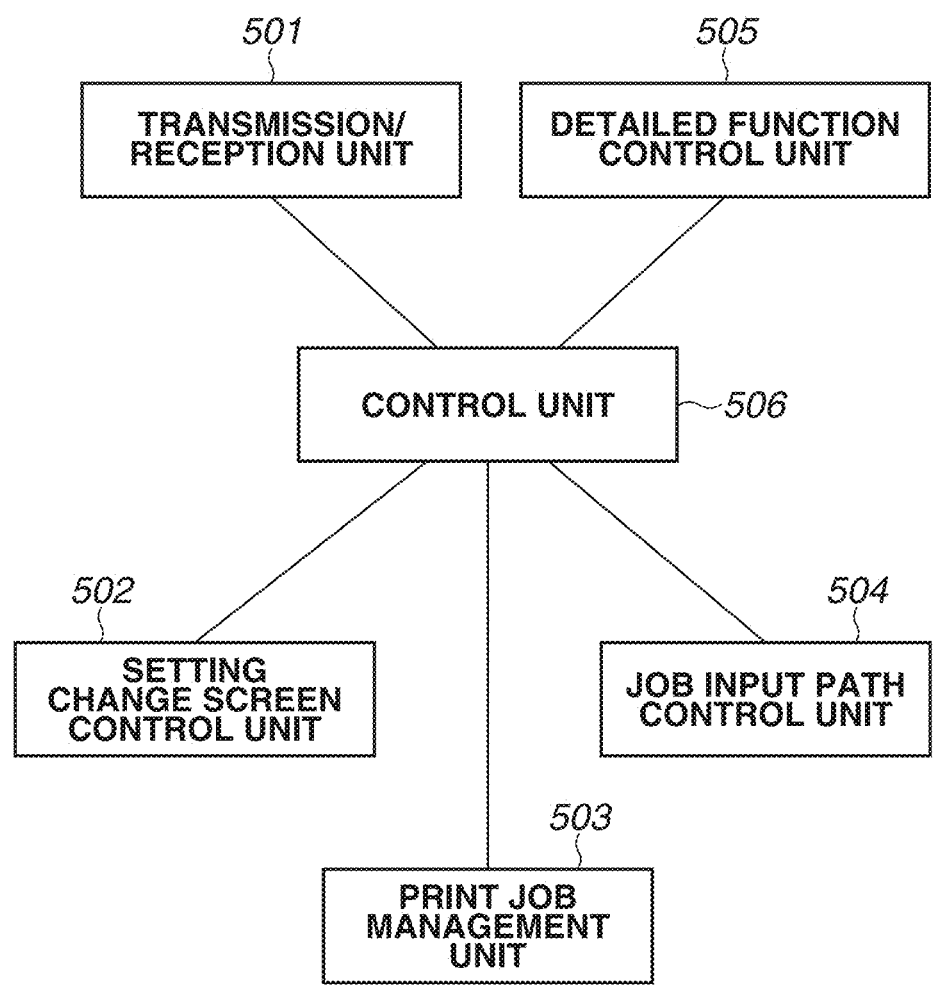
FIG. 5 is a block diagram illustrating examples of software modules of an extended cloud print service according to the first exemplary embodiment.

FIG. 5 is a block diagram illustrating examples of software modules of the extended cloud print service 104 according to the first exemplary embodiment. The extended cloud print service 104 includes one or more information processing apparatuses each including hardware modules similar to those of the client terminal 102 illustrated in FIG. 3. The software modules illustrated in FIG. 5 are implemented such that programs stored in the ROM 701 or the auxiliary storage device 708 are loaded into the RAM 702 and the loaded programs are executed by the CPU 700.

A transmission/reception unit 501 executes transmission and reception of print data via a network. The transmission/reception unit 501 periodically monitors the above-described virtual printer queue of the connected general-purpose cloud print service 103 at predetermined intervals.

A setting change screen control unit 502 controls a screen for making advanced print settings for printing based on document data on a cloud service. Examples of the print settings that can be designated on the print setting screen include a finishing setting depending on a finisher connected to the image forming apparatus 101, a profile setting in which built-in color profiles are applied, and a font substitution setting depending on loaded fonts. On the setting change screen displayed by the setting change screen control unit 502, setting items that cannot be set on the setting change screen displayed by the setting change screen control unit 402 of the general-purpose cloud print service 103 can be set.

A print job management unit 503 manages a print job for printing based on document data on a cloud service. Image forming apparatuses to which the print job can be input from the extended cloud print service 104 are managed in a print queue. The print job received from the general-purpose cloud print service 103 is allocated to the print queue, and the print queue is managed. Advanced print settings information set on an advanced settings screen of the setting change screen control unit 502 is also held and managed in the same print queue. The print job and the advanced print setting information are associated and held in the same print queue as bibliographic information. The bibliographic information will be described in detail below with reference to FIGS. 7A and 7B.

A job input path control unit 504 determines whether advanced print settings are made for the print job, and switches the print data input path between a path in which print data is input via the extended cloud print service 104 and a path in which print data is directly transmitted to the image forming apparatus 101. The job input path control unit 504 checks bibliographic information and determines whether advanced settings information corresponding to a job held in the virtual printer queue of the general-purpose cloud print service 103 is held. If the advanced print setting information is present, the extended cloud print service 104 receives data from the general-purpose cloud print service 103, generates print data, and transmits the generated print data to the image forming apparatus 101. If the advanced settings information is not present, the extended cloud print service 104 directly transmits the print data to the image forming apparatus 101 without involving the extended cloud print service 104.

A detailed function control unit 505 regenerates print job in which the advanced print settings information held in the print queue of the print job management unit 503 is reflected in the print data held in the same print queue. The print data received from the general-purpose cloud print service 103 is generated in a state where only the basic print settings are reflected in the print data. Therefore, the detailed function control unit 505 regenerates the print data in which advanced print settings are reflected. The regenerated print data is held in the print queue of the print job management unit 503 again.

A control unit 506 manages various control processing operations, including transmission and reception of print data, control of an advanced print settings screen, management of advanced print settings information, regeneration of a print job, and control of a print queue according to the first exemplary embodiment.

(User Interface (UI) Screen of Cloud Print Service)

FIGS. 6A and 6B illustrate print setting screens of the general-purpose cloud print service 103 and the extended cloud print service 104, respectively, which are displayed on the operation unit (not illustrated) of the client terminal 102.

FIG. 6A illustrates an example of the setting screen of the general-purpose cloud print service 103. The setting screen includes a printer selection item 601 indicating a print data transmission destination, and a basic print settings area 602 in which basic print settings, such as the number of copies, monochrome printing, double-sided printing, designation of a page range for printing, and a sheet size, can be made. The setting screen also includes a "print" button 603 for transmitting print data and starting print processing, a "cancel" button 604 for cancelling a print instruction, and a "advanced settings" button 605 for shifting to the advanced settings screen of the extended cloud print service 104 on which advanced settings can be made. In the printer selection item 601, a list of printers that can be used for printing by the client terminal 102 is displayed, and the user selects a printer to be used from the list. In the printer selection item 601, not only the image forming apparatuses with which the client terminal 102 can directly communicate, but also image forming apparatuses registered in the general-purpose cloud print service 103 and the extended cloud print service 104 are displayed.

The user operates the printer selection item 601 to select an image forming apparatus as an output destination. After that, the user operates the basic print settings area 602 to make print settings. When the user selects the "print" button 603, printing is executed.

FIG. 6B illustrates an example of the advanced settings screen of the extended cloud print service 104 that can be shifted from the "advanced settings" button 605. The advanced settings screen includes an advanced print settings area 606 in which advanced settings utilizing the characteristics of the image forming apparatus 101 can be made. The advanced settings screen also includes an "OK" button 607 for entering edited print settings, and a "cancel" button 608 for cancelling editing of advanced settings. The user operates the advanced print settings area 606 to set setting items that cannot be made on the setting screen illustrated in FIG. 6A. Examples of the setting items that cannot be set on the setting screen illustrated in FIG. 6A and can be set in the advanced print settings area include the following setting items. That is, a setting item "staple" indicates a setting related to stapling processing on a sheet output from the image forming apparatus 101, and enables setting of stapling locations and the number of locations for stapling. A setting item "punch" indicates a setting related to punching processing on a sheet output from the image forming apparatus 101, and enables setting of the number of holes and locations for punching. A setting item "halftone" is an item for selecting an image processing method used for halftone representation. A setting item "CMYK input profile" is an item for selecting a profile for determining what kind of cyan, magenta, yellow, and black (CMYK) signal values are used to perform printing on image data input in CMYK. A setting item "RGB input profile" is an item for selecting a profile for determining what kind of red, green, and blue (RGB) signal values are used to perform printing on image data input in RGB. A setting item "rendering intent" is an item for setting whether to perform color conversion in which emphasis is placed on a rendering intent. On the advanced settings screen illustrated in FIG. 6B, only the items that cannot be set on the print setting screen illustrated in FIG. 6A are displayed. However, the items that can be set on the print setting screen illustrated in FIG. 6A may also be displayed.

In the "advanced settings" button 605 illustrated in FIG. 6A, information about the external URL indicating the advanced settings screen held in the extended cloud print service 104 is referenced. When the user selects the "advanced settings" button 605, the client terminal 102 accesses the screen held in the extended cloud print service 104.

The user sets various advanced print settings in the advanced print settings area 606 illustrated in FIG. 6B and selects the "OK" button 607. At the time the "OK" button 607 is selected, the screen display returns to the screen illustrated in FIG. 6A. On the other hand, the set advanced print setting information is held as bibliographic information in association with the print job in the extended cloud print service 104 (in the print queue of the print job management unit 503 described above). When the "print" button 603 illustrated in FIG. 6A is selected, the print job is started. The general-purpose cloud print service 103 generates print data, and transmits the generated print data to the extended cloud print service 104. The extended cloud print service 104 generates print data in which advanced settings are reflected, and transmits the generated print data to the image forming apparatus 101. Further, the image forming apparatus 101 executes printing based on the image data received from the extended cloud print service 104.

(Addition of Printer to Extended Cloud Print Service)

Figure 14:
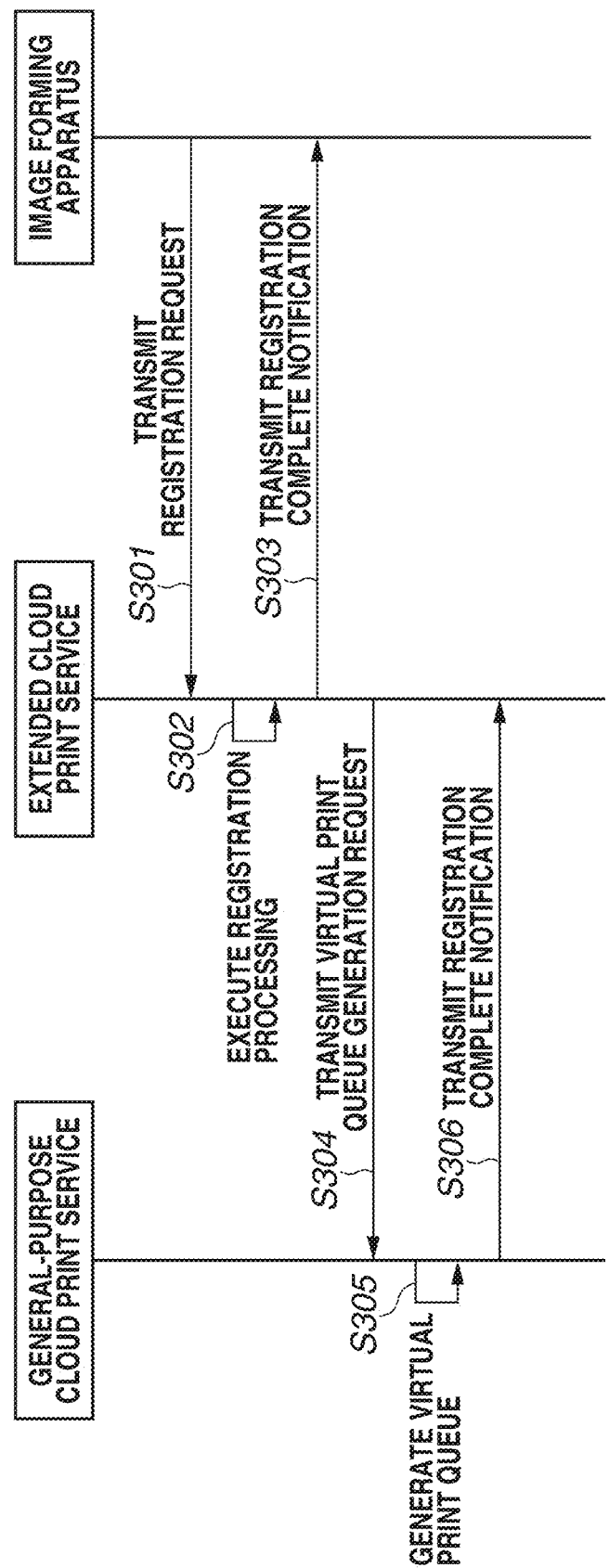
FIG. 14 is a sequence diagram illustrating an example of processing for registering the image forming apparatus in the extended cloud print service according to the first exemplary embodiment.

A processing sequence for registering the image forming apparatus 101 in the extended cloud print service 104 will now be described with reference to FIG. 14. When the processing sequence illustrated in FIG. 14 is executed, printing using the image forming apparatus 101 can be performed via the extended cloud print service 104.

In step S301, the user operates the image forming apparatus 101 to transmit an image forming apparatus registration request to the extended cloud print service 104.

In step S302, the extended cloud print service 104 executes registration processing based on the registration request from the image forming apparatus 101. When the processing of step S302 is executed, the print queue corresponding to the image forming apparatus 101 is generated on the extended cloud print service 104.

In step S303, upon completing the generation of the print queue, the extended cloud print service 104 transmits a registration complete notification to the image forming apparatus 101.

In step S304, the extended cloud print service 104 transmits a virtual print queue generation request to the general-purpose cloud print service 103. The extended cloud print service 104 requests the general-purpose cloud print service 103 to generate the virtual print queue corresponding to the print queue generated in step S302.

In step S305, the general-purpose cloud print service 103 generates the virtual print queue in response to the request.

The processing of step S305 enables input of the print job to the image forming apparatus 101 registered in the extended cloud print service 104 even when printing using the general-purpose cloud print service 103 is performed.

In step S306, upon completing the generation of the virtual print queue, the general-purpose cloud print service 103 transmits a registration complete notification to the extended cloud print service 104.

(Sequence Diagram of Print Setting Reception Processing)

Next, a print setting reception processing sequence according to the first exemplary embodiment to be executed by the client terminal 102, the general-purpose cloud print service 103, and the extended cloud print service 104 will be described with reference to FIG. 8.

First, in step S101, the client terminal 102 sends a request for the print setting screen illustrated in FIG. 6A to the general-purpose cloud print service 103.

Next, in step S102, the general-purpose cloud print service 103 returns the print setting screen illustrated in FIG. 6A as a response to the client terminal 102.

Next, in step S103, the client terminal 102 notifies the general-purpose cloud print service 103 of print setting information about various settings made on the received print setting screen. The client terminal 102 sends such a notification to the general-purpose cloud print service 103, for example, every time the setting items in the basic print settings area 602 illustrated in FIG. 6A are changed.

Next, in step S104, the general-purpose cloud print service 103 updates the print setting screen displayed based on the received print setting information.

Next, in step S105, when the user selects the "advanced settings" button 605 illustrated in FIG. 6A, the client terminal 102 issues an advanced settings screen request to the general-purpose cloud print service 103.

Next, in step S106, the general-purpose cloud print service 103 requests the extended cloud print service 104 to acquire an external URL for accessing the advanced settings screen.

Next, in step S107, the extended cloud print service 104 returns the URL for accessing the advanced settings screen held in the extended cloud print service 104 as a response to the general-purpose cloud print service 103. In the first exemplary embodiment, when the user selects the "advanced settings" button 605, the URL for displaying the advanced settings screen is acquired from the extended cloud print service 104. Alternately, the virtual print queue may be stored in association with the URL for displaying the advanced settings screen when the virtual print queue is generated in advance in the general-purpose cloud print service 103. In this case, the general-purpose cloud print service 103 executes the processing of step S108 without executing the processing of steps S106 and S107.

Next, in step S108, the general-purpose cloud print service 103 notifies the client terminal 102 of the external URL for accessing the advanced settings screen received from the general-purpose cloud print service 103. In this case, the external URL itself may be used as the information to be notified, or a web view in which the external URL is designated may be sent and the advanced settings screen may be displayed in the web view. Any presentation method can be used as long as the advanced settings screen illustrated in FIG. 6B can be presented to the user.

Next, in step S109, the client terminal 102 sends a notification about the advanced print setting information set on the advanced settings screen to the general-purpose cloud print service 103. When the user operates the advanced settings screen and changes the print settings, the client terminal 102 sends a notification about setting contents to the general-purpose cloud print service 103.

Next, in step S110, the general-purpose cloud print service 103 sends the advanced print settings information to the extended cloud print service 104.

Next, in step S111, the extended cloud print service 104 updates the information on the advanced settings screen based on the received information.

In step S112, when the user selects the "OK" button 607, the client terminal 102 transmits an advanced settings complete notification to the general-purpose cloud print service 103.

In step S113, the general-purpose cloud print service 103 receives the advanced settings complete notification from the client terminal 102, and transmits the advanced settings complete notification to the extended cloud print service 104.

In step S114, the extended cloud print service 104 generates bibliographic information based on the contents set on the advanced settings screen and stores the generated bibliographic information. The extended cloud print service 104 issues a print job identification (ID), generates bibliographic information, and stores the bibliographic information in a table illustrated in FIG. 7B. FIG. 7B is a schematic table illustrating bibliographic information stored in the extended cloud print service 104 according to the first exemplary embodiment. A print job ID indicates an ID for identifying a print job. Document data indicates a file name of a file to be printed. Print data indicates a file name of image data to be printed. Basic settings information indicates a setting value for a setting item set in the general-purpose cloud print service 103. Advanced settings information indicates a setting value for a setting item set on the advanced settings screen. In step S114, a record in which the print job ID, document data, print data, and advanced settings information are registered is registered in the bibliographic information table. In other words, basic settings information is not registered in step S114.

In step S115, the extended cloud print service 104 transmits an advanced settings complete notification to the general-purpose cloud print service 103. The extended cloud print service 104 transmits the complete notification with the print job ID generated in step S114.

The general-purpose cloud print service 103 notifies the client terminal 102 of completion of the advanced settings.

Thus, the client terminal 102 terminates the display of the advanced settings screen illustrated in FIG. 6B.

The advanced print settings information received from the client terminal 102 in step S109 may be directly transmitted to the extended cloud print service 104 without involving the general-purpose cloud print service 103, and may be held in the print queue of the print job management unit 503. As the notification sequence to be executed in this case, an optimum mode can be taken depending on the presentation method for the advanced settings screen in step S109.

By the processing sequence described above, the print setting reception processing according to the first exemplary embodiment to be executed by the client terminal 102, the general-purpose cloud print service 103, and the extended cloud print service 104 is executed.

(Sequence Diagram of Print Job Execution Processing)

Figure 9A:
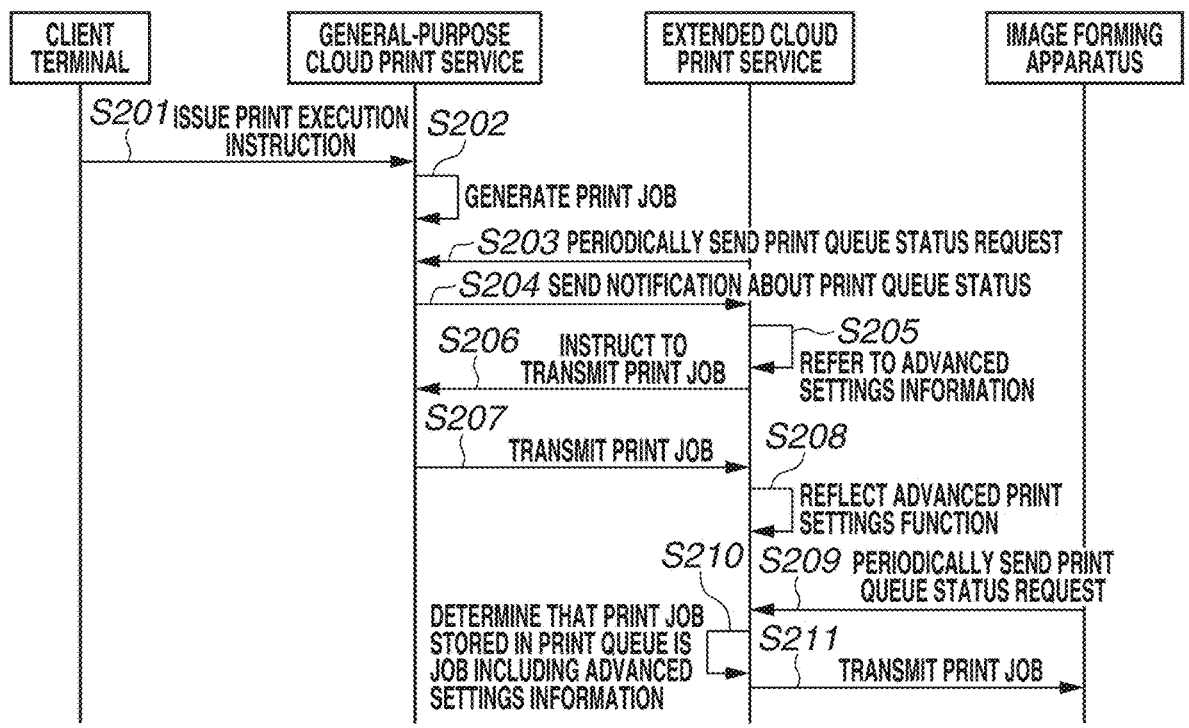
FIGS. 9A and 9B are sequence diagrams each illustrating a processing sequence upon execution of printing according to the first exemplary embodiment.
Figure 9B:
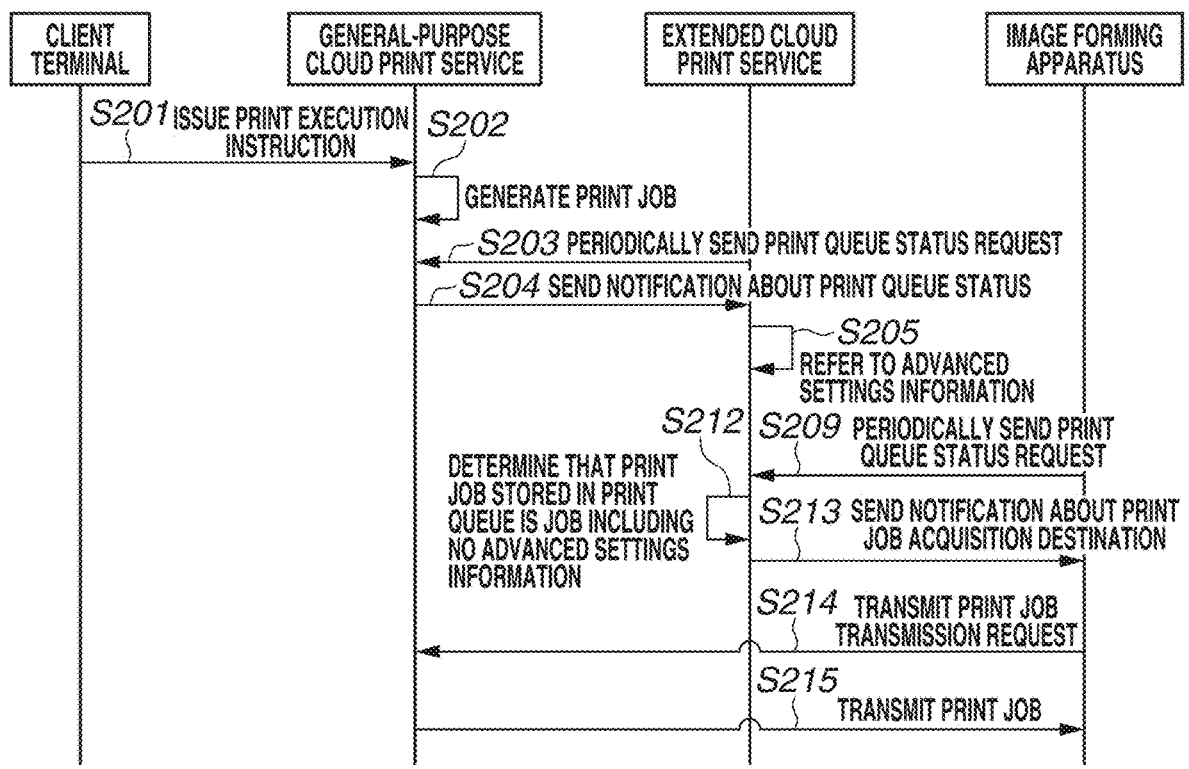

Next, a print job execution processing sequence according to the first exemplary embodiment to be executed by the client terminal 102, the general-purpose cloud print service 103, the extended cloud print service 104, and the image forming apparatus 101 will be described with reference to FIGS. 9A and 9B. FIG. 9A illustrates the print job execution processing sequence when advanced print settings are used. FIG. 9B illustrates the print job execution processing sequence when advanced print settings are not used. The same processes in FIGS. 9A and 9B are denoted by the same step numbers, and only the processes illustrated in FIG. 9A will be described below.

First, in step S201, the client terminal 102 issues a print execution instruction to the general-purpose cloud print service 103. The user selects the "print" button 603 on the print setting screen illustrated in FIG. 6A. When the "print" button 603 is selected, the client terminal 102 instructs the general-purpose cloud print service 103 to execute printing.

Next, step S202, the general-purpose cloud print service 103 generates a print job including print data and bibliographic information to the virtual printer queue of the print job management unit 403. In step S202, the general-purpose cloud print service 103 registers the bibliographic information about the job for printing in a table managed by the print job management unit 403. FIG. 7A is a bibliographic information table managed by the print job management unit 403 of the general-purpose cloud print service 103. A print job ID indicates identification information for identifying a print job. When the print job ID is sent from the extended cloud print service 104 in step S115 illustrated in FIG. 8, the same ID is assigned. If advanced settings are not made, the general-purpose cloud print service 103 generates an ID, and registers the generated ID in the bibliographic information table. Document data indicates a file name of a print document registered in the general-purpose cloud print service 103. Print data indicates a file name of a print job including the print data and print settings generated in step S202. Basic settings information indicates a setting value set on the print setting screen provided by the general-purpose cloud print service 103. Assume herein that only settings changed from default setting values are stored.

Next, in step S203, the extended cloud print service 104 sends a status request to the general-purpose cloud print service 103 to ask whether a print job exists in the virtual print queue of the general-purpose cloud print service 103. As described above, the virtual print queue status request for the general-purpose cloud print service 103 is periodically sent at predetermined timings and is periodically monitored.

Next, in step S204, the general-purpose cloud print service 103 notifies the extended cloud print service 104 of the current status of the virtual print queue. In step S204, the general-purpose cloud print service 103 returns information indicating whether a print job exists in the virtual print queue, for which an inquiry has been made, to the extended cloud print service 104. If a print job exists in the virtual print queue, the general-purpose cloud print service 103 returns information stored in the bibliographic information to the extended cloud print service 104. The extended cloud print service 104 adds the received bibliographic information to the table illustrated in FIG. 7B. If the bibliographic information about the print job ID stored in the table is already received, the bibliographic information is updated. In this case, the basic settings information about the print job in which detailed information is set is added to a processing information table managed by the extended cloud print service 104.

Next, in step S205, the extended cloud print service 104 detects that a print job exists in the virtual print queue of the general-purpose cloud print service 103 based on the notification from the general-purpose cloud print service 103. After that, the extended cloud print service 104 refers to the bibliographic information table of the print job management unit 503 in the extended cloud print service 104, and determines whether the print job for which printing is instructed is a job for which advanced settings are made.

FIG. 9A illustrates an example where advanced settings are made.

Next, in step S206, the extended cloud print service 104 instructs the general-purpose cloud print service 103 to transmit a print job.

Next, in step S207, the general-purpose cloud print service 103 generates a print job based on print data and bibliographic information, and transmits the generated print job to the extended cloud print service 104.

Next, in step S208, the extended cloud print service 104 refers to advanced print settings included in the bibliographic information held in the print queue of the print job management unit 503 in the extended cloud print service 104, regenerates print data to which the corresponding advanced print settings function is applied, and reflects the advanced print settings function in the print data. The print job including the regenerated print data is held in the print queue of the print job management unit 503 again.

Next, in step S209, the image forming apparatus 101 sends a status inquiry about whether a print job exists in the print queue of the extended cloud print service 104. The inquiry in step S209 is processing to be periodically executed on the extended cloud print service 104 by the image forming apparatus 101.

In step S210, the extended cloud print service 104 determines whether the print job included in the print queue is a print job for which advanced settings are made based on the bibliographic information table. Assume herein that the print job included in the print queue is a print job for which advanced settings are made.

By the processing described above, the print job execution processing is executed by the client terminal 102, the general-purpose cloud print service 103, the extended cloud print service 104, and the image forming apparatus 101 when advanced print settings according to the first exemplary embodiment are used.

On the other hand, the processing sequence illustrated in FIG. 9B is executed when advanced print settings are not used. Step S205 illustrates a processing sequence to be executed in a case where advanced print settings information is not present when the bibliographic information in the print queue is referenced. In this case, steps S205 and S209 are followed by step S212.

In step S212, the extended cloud print service 104 determines whether the print job registered in the print queue is a job for which advanced settings are made. Assume herein that the print job registered in the print queue is a print job for which advanced settings are not made.

In step S213, the extended cloud print service 104 notifies the image forming apparatus 101 of the general-purpose cloud print service 103 as a print job acquisition destination. The extended cloud print service 104 notifies the image forming apparatus 101 of, for example, a URL for accessing the general-purpose cloud print service 103 and the print job ID to be acquired.

In step S214, the image forming apparatus 101 accesses the general-purpose cloud print service 103 and transmits a print job transmission request. The image forming apparatus 101 accesses the URL notified in step S213, and requests the general-purpose cloud print service 103 to transmit the print job corresponding to the notified print job ID.

Steps S213 and S214 may include the following processes. That is, information to be used for acquiring the print job from the general-purpose cloud print service 103 may be preliminarily registered in the image forming apparatus 101. In this case, the extended cloud print service 104 transmits a print job acquisition request to the image forming apparatus 101. The image forming apparatus 101 transmits a print job transmission request to the preliminarily registered image forming apparatus 101 to which the request has been transmitted based on the received print job acquisition request.

In step S215, the general-purpose cloud print service 103 transmits print data on the requested print job ID to the image forming apparatus 101.

By the processing described above, the print job execution processing in which advanced print settings according to the first exemplary embodiment are not used is executed by the client terminal 102, the general-purpose cloud print service 103, the extended cloud print service 104, and the image forming apparatus 101.

According to the first exemplary embodiment, in step S209, the image forming apparatus 101 periodically accesses the extended cloud print service 104 to check the status of the print queue. In steps S209 to S211 illustrated in FIG. 9A, the extended cloud print service 104 may generate a print job in which advanced settings are reflected, and may transmit the print job to the image forming apparatus 101. In step S209 and steps 212 to 215 illustrated in FIG. 9B, the extended cloud print service 104 may request the general-purpose cloud print service 103 to transmit the print job ID to the image forming apparatus 101. In this case, the general-purpose cloud print service 103 transmits the print job corresponding to the notified print job ID to the image forming apparatus 101 in response to the request.

(Bibliographic Information)

The bibliographic information table managed by the print job management unit 403 of the general-purpose cloud print service 103 and the bibliographic information table managed by the print job management unit 503 of the extended cloud print service 104 will now be described with reference to FIGS. 7A and 7B.

FIG. 7A illustrates an example of the bibliographic information table managed by the print job management unit 403 of the general-purpose cloud print service 103. A print job ID indicates identification information for identifying a print job. Document data indicates a file name of document data for printing. Assume herein that document data and image data to be used for printing are collectively referred to as document data. Print data indicates a file name of print data in which the document data and basic print settings are reflected. As basic settings information, setting values set on the print setting screen illustrated in FIG. 6A are stored. A job corresponding to a print job ID "000001" stored in the table illustrated in FIG. 7A indicates that a "Patent.doc" file is printed with settings of "2-in-1", "double-sided", and "color".

FIG. 7B illustrates an example of the bibliographic information table managed by the print job management unit 503 of the extended cloud print service 104. The table illustrated in FIG. 7B stores not only the information illustrated in FIG. 7A, but also advanced settings information. Detailed information about the print job ID "000001" includes information indicating that halftone is set as "resolution", "Japan Color" is set as a CMYK input profile, "sRGB" is set as a RGB input profile, and "Perceptual" is set as a matching method.

In advanced settings for a job corresponding to a print job ID "00002", "none" is set. When the user selects the "print" button 603 without selecting the "advanced settings" button 605 on the print setting screen illustrated in FIG. 6A, the advanced settings information is set to "none". Also, when the user selects the "advanced settings" button 605 and then selects the "cancel" button 608 on the advanced settings screen illustrated in FIG. 6B, the advanced settings information is set to "none". The extended cloud print service 104 refers to the advanced settings information in the table and determines whether a predetermined setting is made.

(Flowchart of Print Setting Reception Processing)

Figure 10:
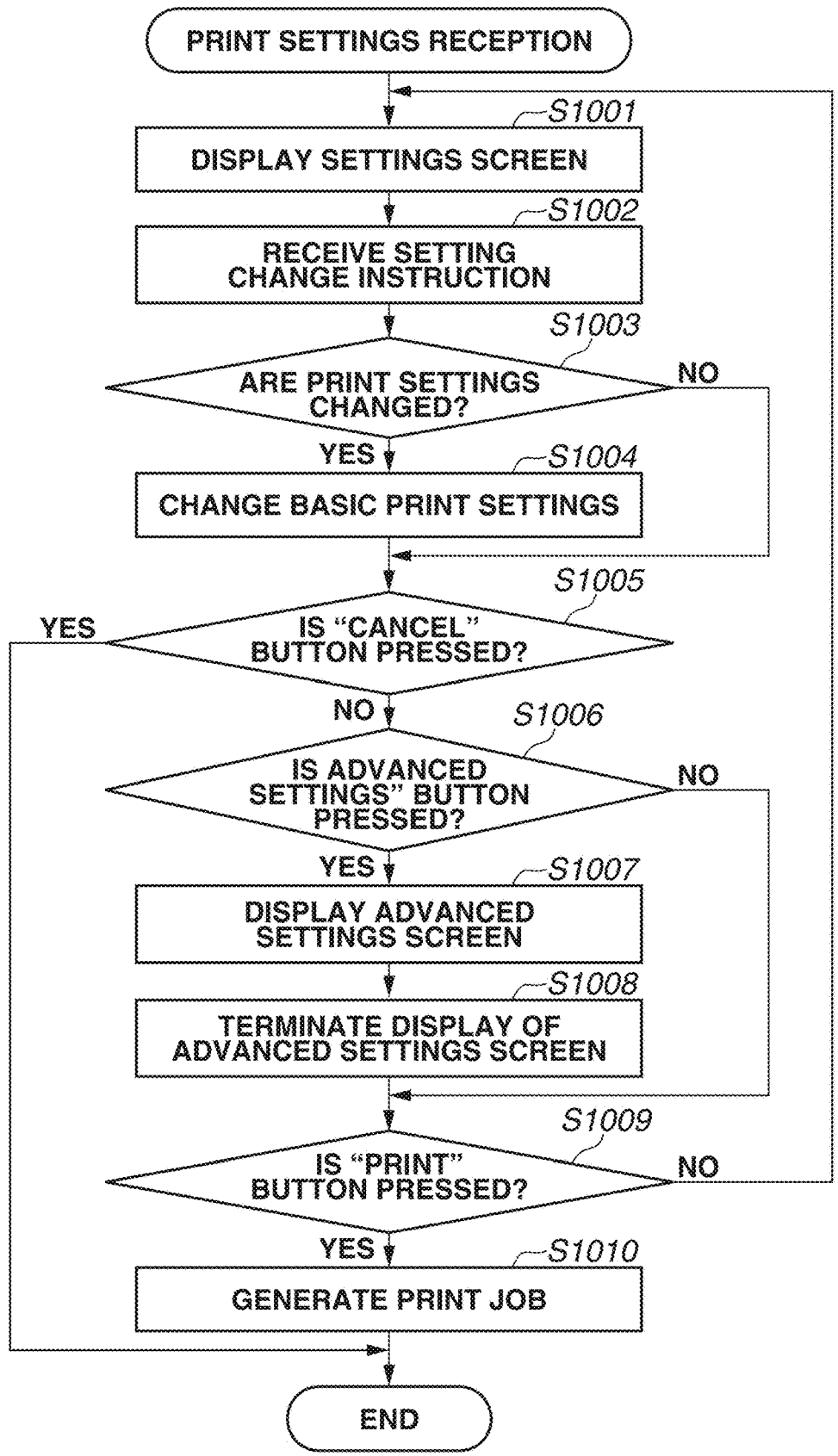
FIG. 10 is a flowchart illustrating an example of processing to be executed by the general-purpose cloud print service when a print setting is made according to the first exemplary embodiment.

Next, print setting reception processing in the general-purpose cloud print service 103 will be described with reference to FIG. 10. The processing illustrated in FIG. 10 is implemented such that programs stored in a ROM or an auxiliary storage device are executed by the CPU of one or more information processing apparatuses constituting the general-purpose cloud print service 103.

Figure 11:
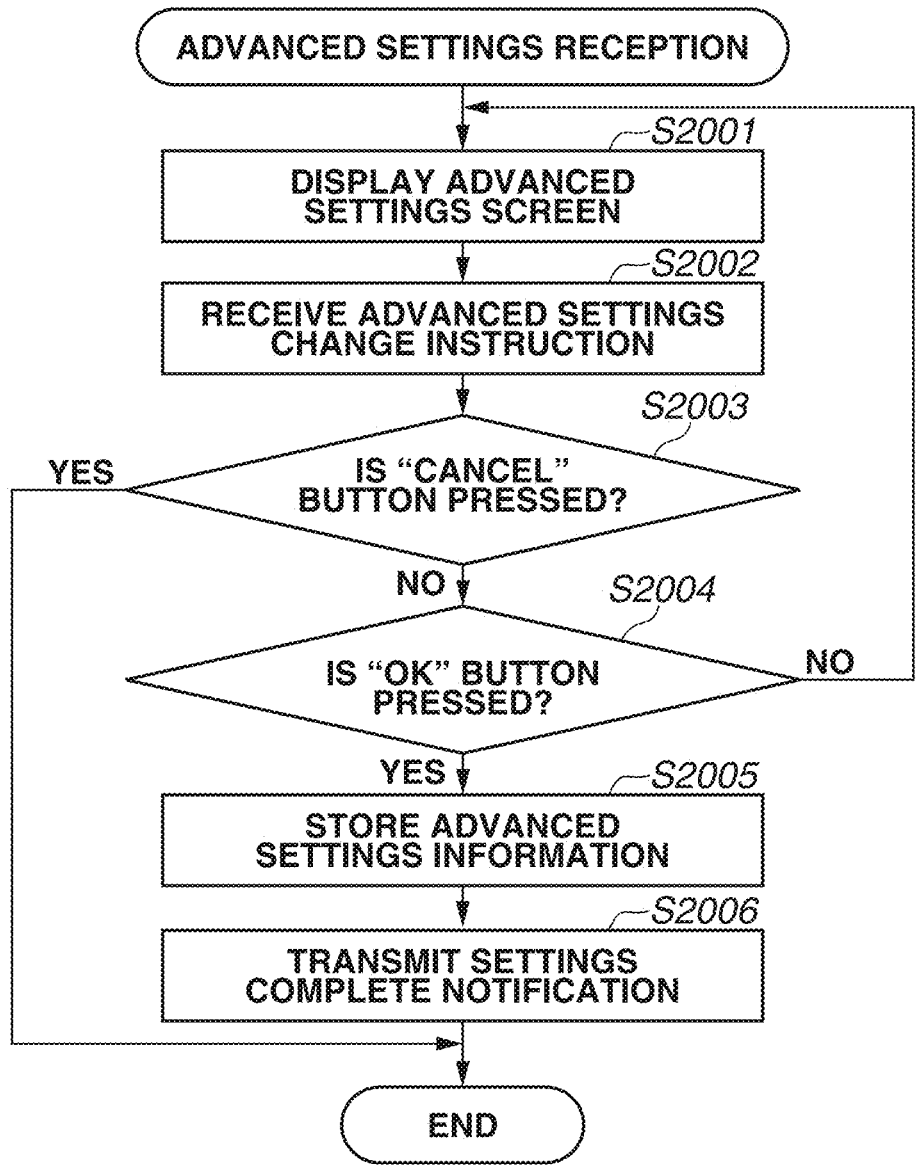
FIG. 11 is a flowchart illustrating an example of processing to be executed when advanced print settings are received according to the first exemplary embodiment.

When the user issues a print instruction for document data to be edited on a cloud service, the print function of the general-purpose cloud print service 103 is first executed. In this print function, only the basic print settings can be used. If advanced print settings are used, it may be desirable to involve a processing flow to be executed by the extended cloud print service 104 as illustrated in FIG. 11. First, the processing flow in which basic print settings can be used is executed in the general-purpose cloud print service 103, and then the processing flow to be executed in the extended cloud print service 104 is executed depending on the necessity of the advanced print settings. Once the print settings are entered, the general-purpose cloud print service 103 stores print data in the print queue and then the processing is terminated. This processing flow is started when the print request for the document data on the cloud service is issued from the user.

First, in step S1001, the control unit 404 displays the print setting screen on which only basic print functions can be designated as illustrated in FIG. 6A.

In step S1002, the control unit 404 receives a setting change instruction from the print setting screen.

In step S1003, the control unit 404 determines whether the print settings are changed. If the user operates the basic print settings area 602 and changes the print settings (YES in step S1003), the processing proceeds to step S1004. On the other hand, if the print settings are not changed (NO in step S1003), the processing proceeds to step S1005.

In step S1004, the control unit 404 controls the setting change screen control unit 402 to update the print setting screen illustrated in FIG. 6A with the screen in which the changed settings are reflected.

In step S1005, the control unit 404 determines whether the "cancel" button 604 illustrated in FIG. 6A is pressed. If the "cancel" button 604 is pressed (YES in step S1005), the processing is terminated. If the "cancel" button 604 is not pressed (NO in step S1005), the processing proceeds to step S1006 to continue the processing.

In step S1006, the control unit 404 determines whether the "advanced settings" button 605 illustrated in FIG. 6A is pressed. If the "advanced settings" button 605 is pressed (YES in step S1006), the processing proceeds to step S1007. If the "advanced settings" button 605 is not pressed (NO in step S1006), the processing proceeds to step S1009.

In step S1007, the control unit 404 displays the advanced settings screen illustrated in FIG. 6B on the client terminal 102. The advanced settings screen is presented by the extended cloud print service 104. In this case, the external URL itself may be used as the information to be transferred, or a web view in which the external URL is designated may be sent and the advanced settings screen may be displayed in the web view, to thereby enhance the user-friendliness. Any presentation method can be used as long as the advanced settings screen illustrated in FIG. 6B can be presented to the user.

In step S1008, the control unit 404 receives the settings complete notification, and then terminates the display of the advanced settings screen.

In step S1009, the control unit 404 determines whether the "print" button 603 illustrated in FIG. 6A is pressed. If the "print" button 603 is pressed (YES in step S1009), the processing proceeds to step S1010. If the "print" button 603 is not pressed (NO in step S1009), the processing returns to step S1001 to repeat the processing.

In step S1010, the control unit 404 generates a print job in which setting values set on the print setting screen illustrated in FIG. 6A are reflected, and stores the generated print job in the print queue of the print job management unit 403.

By the processing described above, the print setting reception processing is executed in the general-purpose cloud print service 103.

Figure 15:
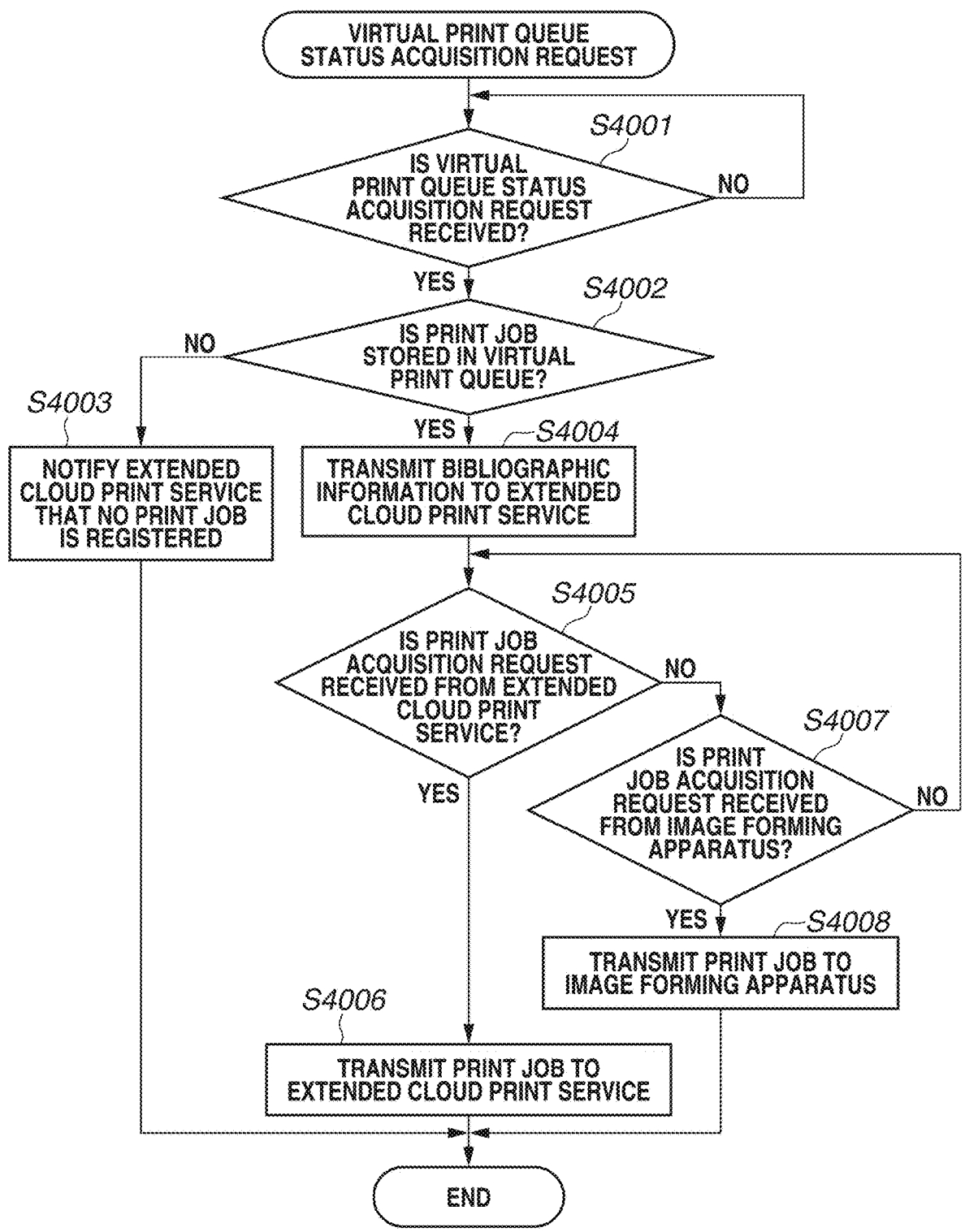
FIG. 15 is a flowchart illustrating an example of processing in which the extended cloud print service accesses a virtual print queue of the general-purpose cloud print service according to the first exemplary embodiment.

Next, processing to be executed when a virtual print queue status acquisition request is received from the extended cloud print service 104 will be described with reference to FIG. 15. The processing illustrated in FIG. 15 is implemented such that programs stored in a ROM or an auxiliary storage device are executed by the CPU of one of more information processing apparatuses constituting the general-purpose cloud print service 103.

In step S4001, the control unit 404 determines whether the virtual print queue status acquisition request is received from the extended cloud print service 104. If the control unit 404 determines that the virtual print queue status acquisition request is not received (NO in step S4001), the processing of step S4001 is repeatedly performed. If the virtual print queue status acquisition request is received (YES in step S4001), the processing proceeds to step S4002.

In step S4002, the control unit 404 determines whether a print job is stored in the virtual print queue. If no print job is stored in the virtual print queue (NO in step S4002), the processing proceeds to step S4003. If a print job is stored in the virtual print queue (YES in step S4002), the processing proceeds to step S4004.

In step S4003, the control unit 404 notifies the extended cloud print service 104 that no print job is registered, and then the processing in this flowchart is terminated.

In step S4004, the control unit 404 reads out bibliographic information corresponding to the print job registered in the virtual print queue from the table managed by the print job management unit 403, and transmits the bibliographic information to the extended cloud print service 104.

In step S4005, the control unit 404 determines whether a print job acquisition request is received from the extended cloud print service 104. If the print job acquisition request is received (YES in step S4005), the processing proceeds to step S4006. In step S4006, the control unit 404 transmits the print job generated in step S1010 illustrated in FIG. 10 to the extended cloud print service 104.

In step S4007, the control unit 404 determines whether a print job acquisition request is received from the image forming apparatus 101. If the print job acquisition request is not received from the image forming apparatus 101 (NO in step S4007), the processing returns to step S4005. On the other hand, if the print job acquisition request is received from the image forming apparatus 101 (YES in step S4007), the processing proceeds to step S4008. In step S4008, the control unit 404 transmits the print job generated in step S1010 illustrated in FIG. 10 to the image forming apparatus 101.

<Flowchart of Advanced Print Settings Reception Processing>

Next, advanced print settings reception processing in the extended cloud print service 104 will be described with reference to FIG. 11. This processing enables designation of the advanced settings, such as a finishing setting depending on a connected finisher and a profile setting in which built-in color profiles are applied, which cannot be designated in print settings for the general-purpose cloud print service 103 and to which the characteristics of the image forming apparatus set as an output destination are applied. The processing illustrated in FIG. 11 is started when the "advanced settings" button 605 is selected on the print setting screen illustrated in FIG. 6A. The processing illustrated in FIG. 11 is implemented such that programs stored in a ROM or an auxiliary storage device are executed by the CPU of one or more information processing apparatuses constituting the extended cloud print service 104.

First, in step S2001, the control unit 506 notifies the general-purpose cloud print service 103 of an external URL through which the advanced print settings screen illustrated in FIG. 6B can be referenced, and displays the screen.

In step S2002, the control unit 506 receives an advanced settings change instruction from the advanced print settings screen. The control unit 506 controls the setting change screen control unit 502 to reflect a change in advanced settings in the screen illustrated in FIG. 6B.

In step S2003, the control unit 506 determines whether the "cancel" button 608 illustrated in FIG. 6B is pressed. If the "cancel" button 608 is pressed (YES in step S2003), the processing illustrated in FIG. 11 is terminated. If the "cancel" button 608 is not pressed (NO in step S2003), the processing proceeds to step S2004.

In step S2004, the control unit 506 determines whether the "OK" button 607 illustrated in FIG. 6B is pressed. If the "OK" button 607 is pressed (YES in step S2004), the processing proceeds to step S2005. If the "OK" button 607 is not pressed (NO in step S2004), the processing returns to step S2001 to repeat the processing.

In step S2005, the control unit 506 stores advanced print settings information set on the advanced print settings screen as bibliographic information in association with the corresponding print job. In step S2005, the control unit 506 controls the print job management unit 503 to generate a record in the table for managing bibliographic information. In this case, the print job management unit 503 issues a print job ID and registers the file name of document data, the file name of print data, and advanced settings information in the table in association with the print job ID.

In step S2006, the control unit 506 transmits a settings complete notification to the general-purpose cloud print service 103. The settings complete notification includes the print job ID issued in step S2005.

By the processing described above, the advanced print settings reception processing is executed in the extended cloud print service 104.

(Flowchart of Print Job Execution Processing)

Figure 12:
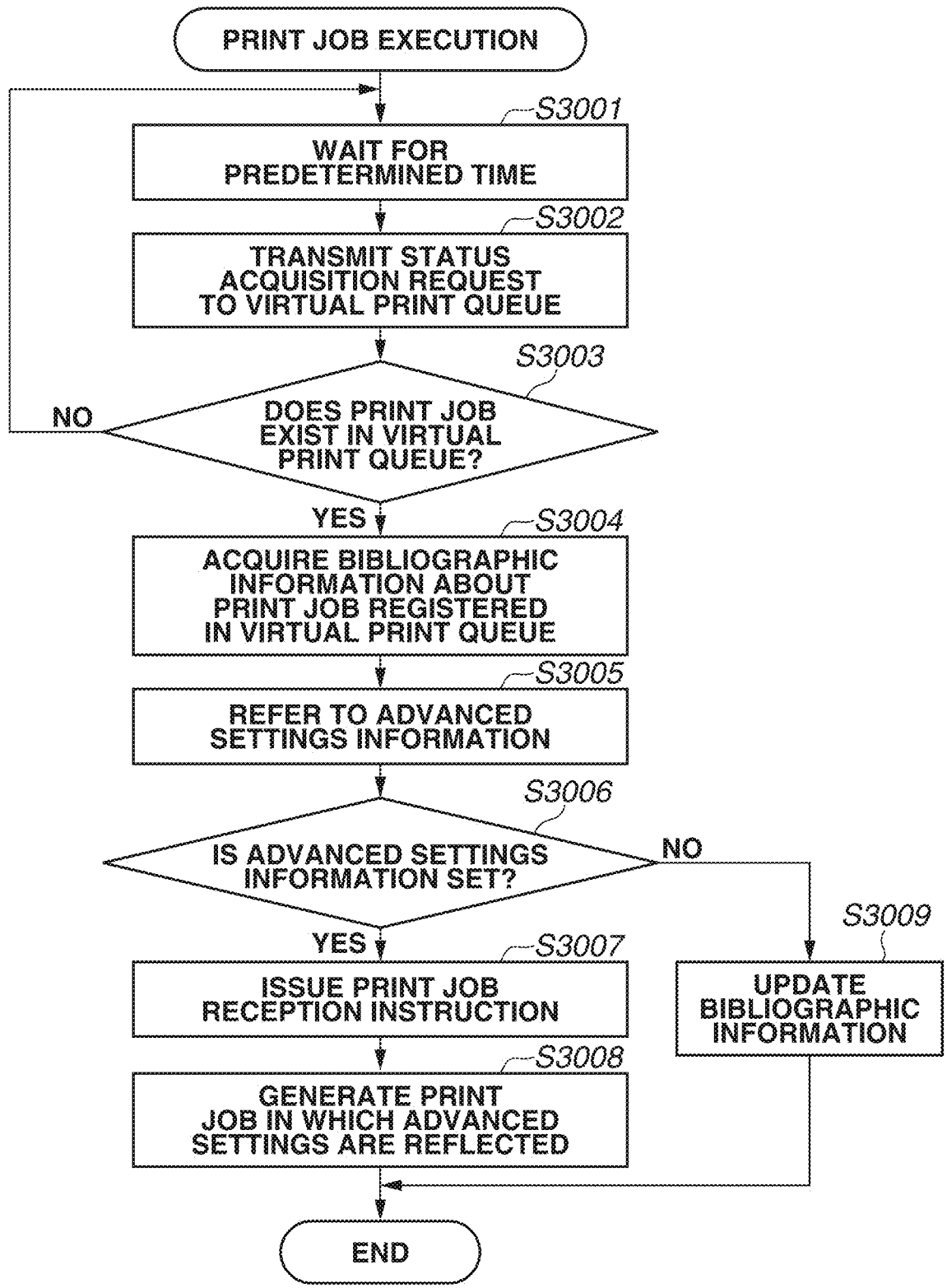
FIG. 12 is a flowchart illustrating an example of processing for executing a print job according to the first exemplary embodiment.

Next, print job execution processing in the extended cloud print service 104 will be described with reference to FIG. 12. The processing in this flowchart is started when the extended cloud print service 104 starts to periodically monitor the virtual print queue. The processing illustrated in FIG. 12 is implemented such that programs stored in a ROM or an auxiliary storage device are executed by the CPU of one or more information processing apparatuses constituting the extended cloud print service 104.

First, in step S3001, the control unit 506 waits for a predetermined time. The term "predetermined time" refers to a polling time for transmitting a status acquisition request for the virtual print queue.

In step S3002, the control unit 506 transmits, to the general-purpose cloud print service 103, the status acquisition request indicating whether a print job exists in the virtual print queue of the general-purpose cloud print service 103.

In step S3003, the control unit 506 determines whether a print job exists in the virtual print queue of the general-purpose cloud print service 103 acquired in step S3002. If a print job exists in the virtual print queue (YES in step S3003), the processing proceeds to step S3004. If no print job exists in the virtual print queue (NO in step S3003), the processing returns to step S3001 to repeat the processing.

In step S3004, the control unit 506 acquires bibliographic information about the print job registered in the virtual print queue.

In step S3005, the control unit 506 controls the print job management unit 503 to access the table for managing the bibliographic information illustrated in FIG. 7B.

In step S3006, the control unit 506 determines whether advanced print settings associated with the print job ID of the print job acquired in step S3004 are made. In step S3006, the control unit 506 controls the job input path control unit 504, and determines whether advanced print settings are made for the print job corresponding to the received print job ID. If the print job ID is not stored, or if advanced settings associated with the print job ID indicate "none", the control unit 506 determines that the advanced settings information is not set (NO in step S3006), and the processing proceeds to step S3009. On the other hand, if the advanced settings information associated with the print job ID of the received print job is stored (YES in step S3006), the processing proceeds to step S3007.

In step S3007, the control unit 506 sends a print job reception request to the general-purpose cloud print service 103, and receives a print job.

In step S3007, the control unit 506 regenerates a print job by applying the corresponding advanced print settings to the print job received in step S3006. The control unit 506 regenerates print data by reflecting advanced settings information stored in the table in the print data included in the received print job. The print job regenerated based on the regenerated print data and bibliographic information is stored in the print queue of the extended cloud print service 104. In step S3008, the control unit 506 controls the detailed function control unit 505 to update the bibliographic information table based on the received bibliographic information.

In step S3008, the control unit 506 transmits the print job regenerated in step S3007 to the image forming apparatus 101, and then the processing is terminated.

In step S3009, the control unit 506 controls the print job management unit 503 to update the bibliographic information table. If the print job ID corresponding to the print job ID acquired in step S3004 is not stored in the table, the print job management unit 503 creates a record of the print job ID in the table for managing bibliographic information, and adds the record to the table.

Figure 16:
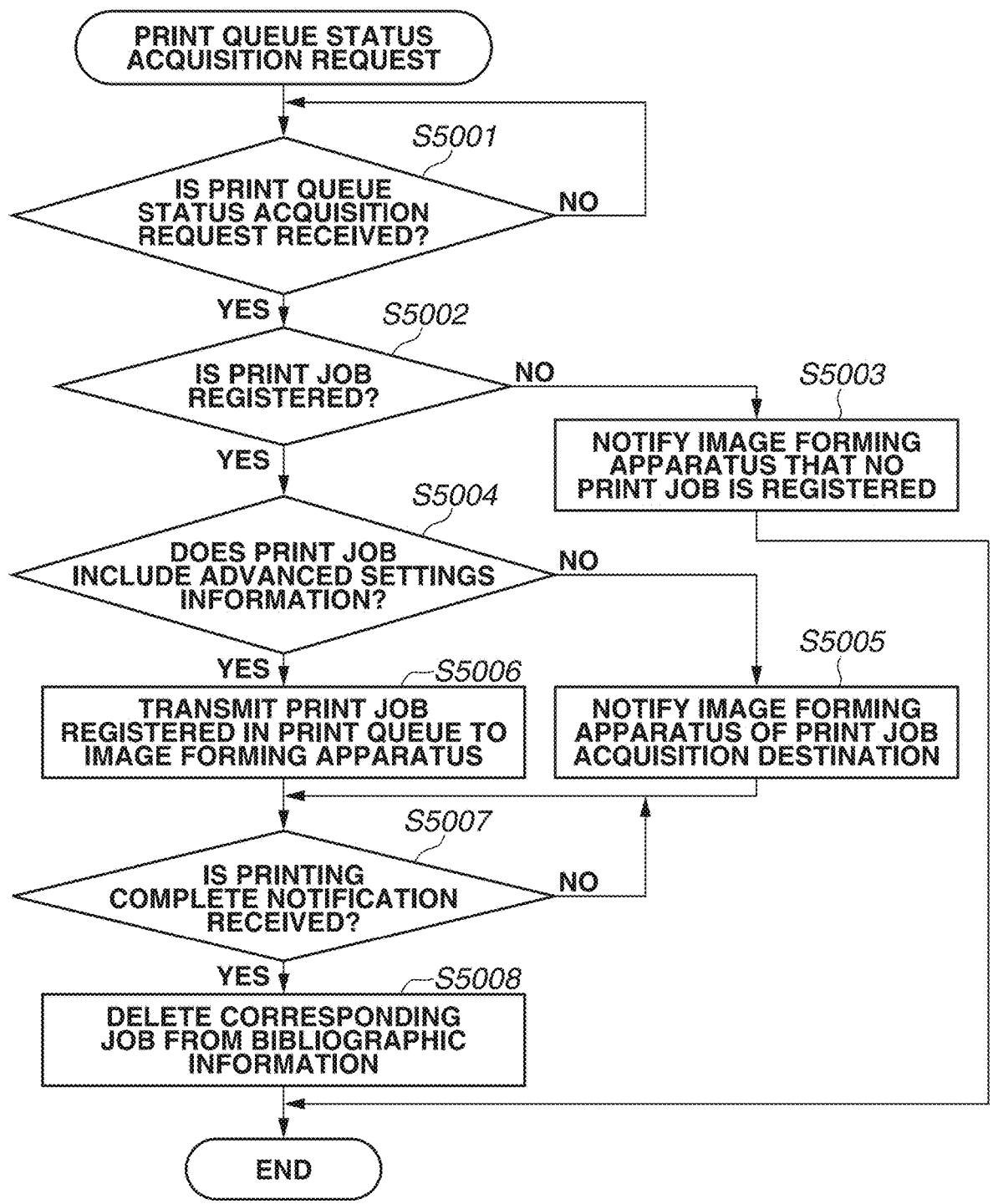
FIG. 16 is a flowchart illustrating an example of processing to be executed by the extended cloud print service to perform printing according to the first exemplary embodiment.

Next, processing to be executed when the extended cloud print service 104 receives the print queue status acquisition request from the image forming apparatus 101 will be described with reference to FIG. 16. The processing illustrated in FIG. 16 is implemented such that programs stored in a ROM or an auxiliary storage device are executed by the CPU of one or more information processing apparatuses constituting the extended cloud print service 104.

In step S5001, the control unit 506 determines whether the print queue status acquisition request is received. If the print queue status acquisition request is not received (NO in step S5001), the processing returns to step S5001 to repeat the processing. On the other hand, if the print queue status acquisition request is received (YES in step S5001), the processing proceeds to step S5002.

In step S5002, the control unit 506 determines whether a print job exists in the print queue for which the status acquisition request is issued. The control unit 506 controls the print job management unit 503 to determine whether information about the print job is stored in the bibliographic information table illustrated in FIG. 7B. The control unit 506 determines that the print job corresponding to the record in which basic settings information is set among the records stored in the table is a print job in the print queue. If no print job exists in the print queue (NO in step S5002), the processing proceeds to step S5003. On the other hand, if a print job exists in the print queue (YES in step S5002), the processing proceeds to step S5004. In the first exemplary embodiment, it is determined whether the print job is a print job included in the print queue based on whether basic settings information stored in the bibliographic information table is set. Any method other than the above-described method can be employed, as long as it can be determined whether a print job exists in the print queue. For example, a flag indicating whether a print job is already generated in a record may be added to the bibliographic information table illustrated in FIG. 7B, and it may be determined whether a print job exists in the print queue with reference to the flag. Further, another table for managing print jobs registered in the print queue may be provided and it may be determined whether a print job exists in the print queue with reference to the table.

In step S5003, the control unit 506 notifies the image forming apparatus 101 that no print job is registered in the print queue, and then the processing in this flowchart is terminated.

In step S5004, the control unit 506 refers to the table illustrated in FIG. 7B and determines whether the print job registered in the print queue is a job for which advanced settings are made. The control unit 506 controls the job input path control unit 504 to determine whether the print job registered in the print queue is a job including advanced settings information. The job input path control unit 504 refers to the table illustrated in FIG. 7B and determines whether the print job is a job including advanced settings information based on whether the advanced settings information column indicates "none". If the print job is a job including no advanced settings information (NO in step S5004), the processing proceeds to step S5005. On the other hand, if the print job is a job including advanced settings information (YES in step S5004), the processing proceeds to step S5006. In the first exemplary embodiment, the job input path control unit 504 refers to the bibliographic information table. However, any method other than the above-described method may be employed, as long as it can be determined whether the print job is a job for which the predetermined setting is made as detailed information.

In step S5005, the control unit 506 notifies the image forming apparatus 101 of a print job acquisition destination. The control unit 506 controls the job input path control unit 504 to notify the image forming apparatus 101 to transmit the print job acquisition request to the general-purpose cloud print service 103. The job input path control unit 504 transmits the request with information used for the image forming apparatus 101 to access the general-purpose cloud print service 103, such as the URL of the general-purpose cloud print service 103.

In step S5006, the control unit 506 transmits the print job registered in the print queue to the image forming apparatus 101. The control unit 506 controls the job input path control unit 504 to transmit the print job generated in step S3008 illustrated in FIG. 12 to the image forming apparatus 101.

In step S5007, the control unit 506 determines whether a printing complete notification is received from the image forming apparatus 101. If the printing complete notification is received (YES in step S5007), the processing proceeds to step S5008. If the printing complete notification is not received (NO in step S5007), the control unit 506 continues the processing of step S5007.

In step S5008, the control unit 506 controls the print job management unit 503 to delete, from the bibliographic information, bibliographic information corresponding to the print job for which printing is completed. Then, the processing in this flowchart is terminated.

In the processing described above, when a print job is executed via a cloud print service, it is determined whether advanced print settings are used as print settings, and it is also determined whether to transmit the print job via the extended cloud print service 104 depending on the determination result. For example, if advanced settings are made, the extended cloud print service 104 regenerates a print job and transmits the regenerated print job to the image forming apparatus 101. Thus, printing in which setting items that cannot be set in the general-purpose cloud print service 103 are reflected can be executed. On the other hand, if advanced settings are not made, the print job is transmitted to the image forming apparatus 101 without involving the extended cloud print service 104. Thus, a load due to transfer of data to be printed between the cloud service and the server system can be reduced depending on the print settings made for the print data.

In the first exemplary embodiment, the image forming apparatus 101 periodically accesses the extended cloud print service 104 to determine whether a print job exists in the print queue. Then, the determination as to which one of the extended cloud print service 104 and the general-purpose cloud print service 103 transmits the print job is made depending on whether the print job that exists in the print queue is a job for which advanced settings are made.

According to a second exemplary embodiment, the image forming apparatus 101 is caused to display the print job stored in the extended cloud print service 104, and the image forming apparatus 101 selects a job for printing. The extended cloud print service 104 determines whether the print job for which printing is instructed is a job for which advanced settings are made. The extended cloud print service 104 determines a path for transmitting the print job to the image forming apparatus 101 based on the determination result. The hardware configuration and software configuration of each device in the second exemplary embodiment are similar to those described in the first exemplary embodiment. The print setting screens illustrated in FIGS. 6A and 6B and the bibliographic information tables illustrated in FIGS. 7A and 7B are also similar to those described in the first exemplary embodiment. Only differences between the second exemplary embodiment and the first exemplary embodiment will be described below.

According to the second exemplary embodiment, when the image forming apparatus 101 to be used for printing is selected on the print setting screen illustrated in FIG. 6A, not only the image forming apparatus 101 used for printing, but also the extended cloud print service 104 can be designated. When the user selects the extended cloud print service 104 and issues a print instruction, the general-purpose cloud print service 103 transmits a print job to the virtual print queue of the extended cloud print service 104. The print job registered in the virtual print queue of the extended cloud print service 104 can be set for printing to be executed by the image forming apparatus 101 registered in the extended cloud print service 104.

Figure 17A:
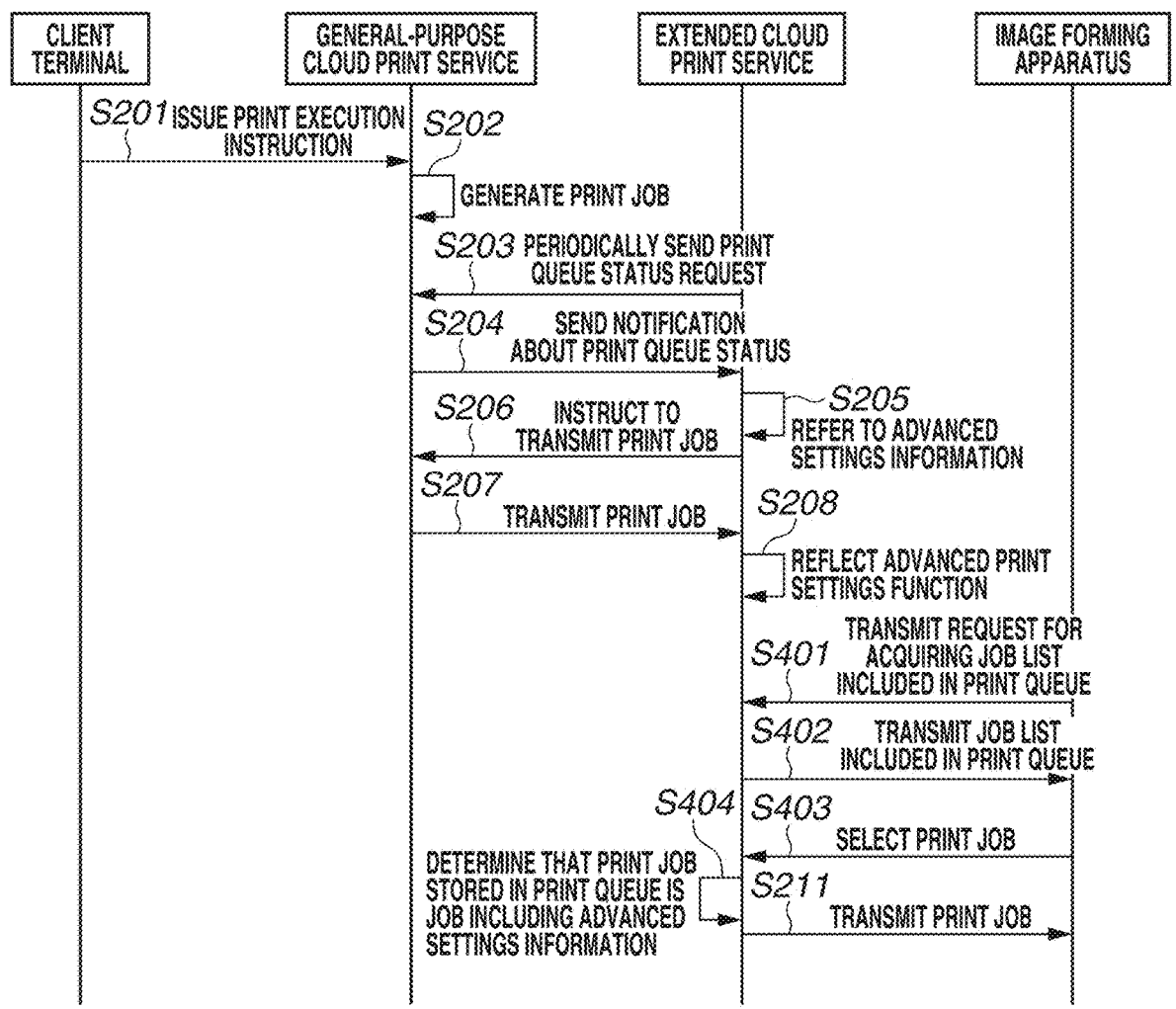
FIGS. 17A and 17B are sequence diagrams each illustrating a processing sequence upon execution of printing according to a second exemplary embodiment.
Figure 17B:
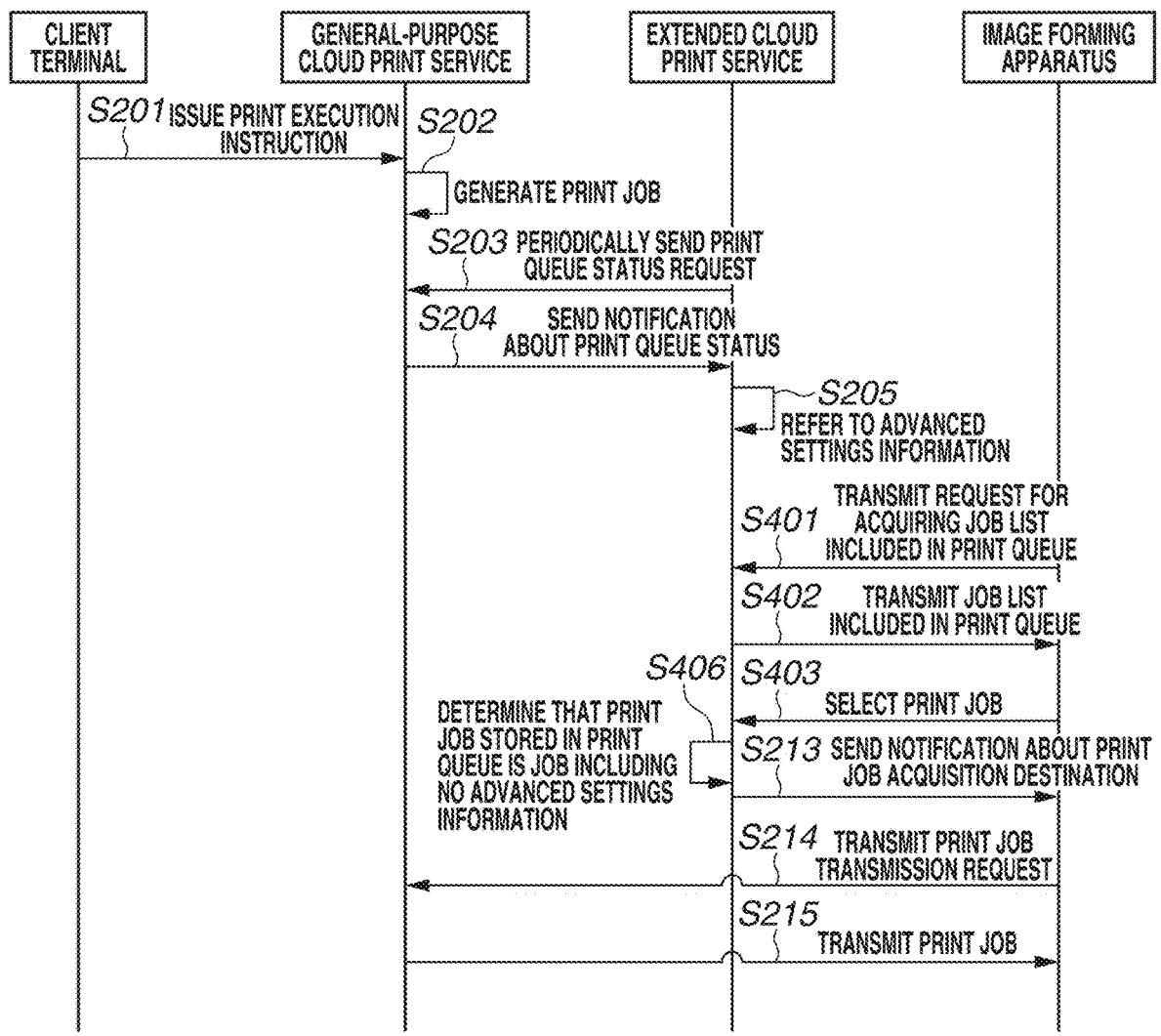

FIGS. 17A and 17B are sequence diagrams each illustrating a printing processing flow according to the second exemplary embodiment. The same processes in FIGS. 9A and 9B are denoted by the same step numbers, and the descriptions thereof are omitted.

FIG. 17A is a sequence diagram in a case where the print job for which printing is instructed by the image forming apparatus 101 is a job for which advanced settings are made. In step S401, the image forming apparatus 101 transmits a request for acquiring a list of print jobs included in the print queue of the extended cloud print service 104. The image forming apparatus 101 executes the processing of step S401 when, for example, the user has logged in. Alternatively, the processing of step S401 may be executed when the user issues an instruction to access the extended cloud print service 104.

In step S402, the extended cloud print service 104 transmits bibliographic information about the print jobs included in the print queue to the image forming apparatus 101. The image forming apparatus 101 displays the received print job bibliographic information list.

In step S403, the image forming apparatus 101 receives the selection of a print job for executing printing from the displayed print job list, and notifies the extended cloud print service 104 of the print job ID of the selected print job.

In step S404, the extended cloud print service 104 determines whether the print job for which printing is instructed is a job in which advanced settings information is set. FIG. 17A illustrates a case where advanced settings information is set. If the print job for which printing is instructed is a print job in which advanced settings information is set, the processing proceeds to step S211. In step S211, the extended cloud print service 104 transmits the print job to the image forming apparatus 101.

FIG. 17B is a sequence diagram in a case where the print job for which printing is instructed is a print job including no advanced settings information.

In step S406, it is determined whether the print job for which printing is instructed is a job in which advanced settings are made. If the print job is a job for which advanced settings are not made, the processing proceeds to step S213. In step S213, a notification indicating the destination of the print job acquisition request is sent to the image forming apparatus 101. This enables the image forming apparatus 101 to transmit the print job acquisition request to the notification destination.

Figure 18:
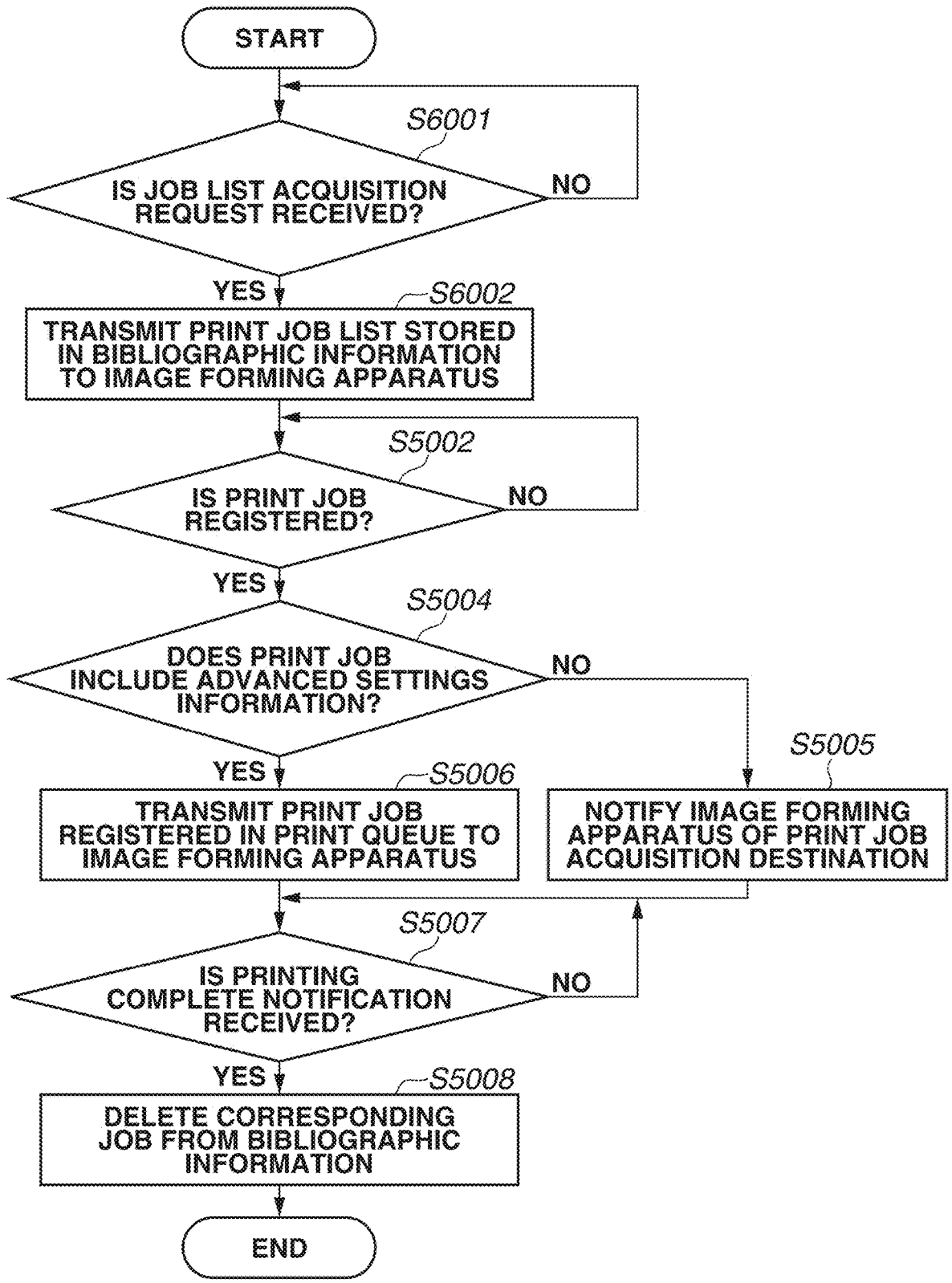
FIG. 18 is a flowchart illustrating an example of processing to be executed by the extended cloud print service to perform printing according to the second exemplary embodiment.

FIG. 18 is a flowchart illustrating processing to be executed in the extended cloud print service 104 according to the second exemplary embodiment. The processing illustrated in FIG. 18 is implemented such that programs stored in a ROM or an auxiliary storage device are executed by the CPU of one or more information processing apparatuses constituting the extended cloud print service 104. The same processes as those in FIG. 16 are denoted by the same step numbers, and the descriptions thereof are omitted.

In step S6001, the control unit 506 determines whether a request for acquiring the print job list is received. The processing in step S6001 is repeatedly performed until the job list acquisition request is received.

In step S6002, the control unit 506 transmits, to the image forming apparatus 101, a list of jobs for which the basic settings information is set among the records stored in the bibliographic information table.

According to the second exemplary embodiment, in a case where the user selects a print job from among the print jobs included in the print queue, if the print job is a job for which the predetermined setting is made, the extended cloud print service 104 transmits the print job to the image forming apparatus 101. On the other hand, if the print job is a print job for which the predetermined setting is not made, the general-purpose cloud print service 103 transmits the print job to the image forming apparatus 101 without involving the extended cloud print service 104. The configuration according to the second exemplary embodiment enables any image forming apparatus registered in the extended cloud print service 104 to execute printing without the need for selecting the image forming apparatus 101 to be used for printing at the timing when the print instruction is issued.

In the exemplary embodiments described above, when the "OK" button 607 is selected on the advanced settings screen illustrated in FIG. 6B, bibliographic information including advanced settings information is stored in the table of the extended cloud print service 104. When the extended cloud print service 104 receives the basic settings information set on the print setting screen illustrated in FIG. 6A and registers the bibliographic information in the table of the extended cloud print service 104, both the basic settings information and the advanced settings information may be registered in the table. In this case, for example, a flag indicating whether the general-purpose cloud print service 103 has already generated a print job may be added to the bibliographic information table. The extended cloud print service 104 receives the print queue status acquisition request from the image forming apparatus 101 (step S209 in FIGS. 9A and 9B), and determines whether a print job exists in the print queue with reference to the flag. The extended cloud print service 104 determines that a print job exists in the print queue if the print job ID for which the flag is ON, which indicates that the print job has already been generated, is registered in the bibliographic information table. On the other hand, the extended cloud print service 104 determines that no print job exists in the print queue if the print job ID for which the flag is ON, which indicates that the print job has already been generated, is not registered in the bibliographic information table.

According to the above-described configuration, a load due to transfer of data to be printed between the cloud service and the server system can be reduced depending on print settings made for print data.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-212297, filed Nov. 25, 2019, which is hereby incorporated by reference herein in its entirety.

What is claimed is:
1. A server system comprising:
a determination unit configured to determine whether received print data is print data for which a predetermined print setting is made;
an acquisition unit configured to acquire first print data from another server system, the first print data being determined to be print data for which the predetermined print setting is made by the determination unit;
a first transmission unit configured to transmit the first print data acquired by the acquisition unit to an image forming apparatus; and
a control unit configured to control the image forming apparatus to acquire second print data from the other server system without acquiring the second print data determined to be print data for which the predetermined print setting is not made by the determination unit.

2. The server system according to claim 1, further comprising a storage unit configured to store setting information about print data compatible with printing to be executed by the image forming apparatus.

3. The server system according to claim 2, further comprising a reception unit configured to receive a printing complete notification based on information indicating that the image forming apparatus has completed printing for the second print data,
wherein the setting information about the print data stored in the storage unit is deleted based on the printing complete notification received by the reception unit.

4. The server system according to claim 2, wherein the storage unit stores identification information about the print data in association with setting information set for the print data.

5. The server system according to claim 4, wherein the control unit sends a notification to the image forming apparatus to acquire the print data from the image forming apparatus based on a determination that the identification information about the print data for which an instruction is issued to perform printing based on the print data is not stored in the storage unit, the determination being made by the determination unit.

6. The server system according to claim 1,
wherein the other server system causes a client terminal to display a first print setting screen, and
wherein the server system causes the client terminal to display a second print setting screen for setting a setting item that is not settable on the first print setting screen.

7. The server system according to claim 6,
wherein the storage unit stores information set on the second print setting screen, and
wherein the determination unit determines whether the print data is print data for which the predetermined setting is made based on whether the information set on the second print setting screen is stored in the storage unit.

8. The server system according to claim 6, wherein the predetermined print setting is a print setting made through the second print setting screen.

9. The server system according to claim 6, further comprising:
a registration unit configured to register the image forming apparatus in the server system; and
a second transmission unit configured to transmit, to the other server system, information about the image forming apparatus registered by the registration unit,
wherein the first setting screen is a screen configured to select an image forming apparatus to be used for printing from among one or more of the image forming apparatuses based on at least the information about the image forming apparatus transmitted from the second transmission unit.

10. The server system according to claim 6, wherein the setting item that is settable on the second print setting screen and is not settable on the first print setting screen includes at least one of a folding setting, a poster print setting, a stapling setting, and a punching setting.

11. The server system according to claim 1, further comprising another acquisition unit configured to acquire information about print data stored in the other server system.

12. The server system according to claim 11, wherein the other acquisition unit transmits, to the other server system, a request for the other server system to acquire information about the print data at a predetermined time interval.

13. The server system according to claim 1, wherein the acquisition unit acquires the print data from the other server system based on information indicating that the print data corresponding to information about the print data acquired by the other acquisition unit is print data for which the predetermined setting is made.

* * * * *